United States Patent [19]
Mizasawa et al.

[11] Patent Number: 5,270,990
[45] Date of Patent: Dec. 14, 1993

[54] TRACKING ERROR SIGNAL DETECTING APPARATUS USING AN ELECTRON BEAM AND APPARATUS FOR EFFECTING RECORDING/REPRODUCTION OF INFORMATION BY THE UTILIZATION OF A PLURALITY OF ELECTRON BEAMS

[75] Inventors: Nobutoshi Mizasawa, Sagamihara; Takahiko Ishiwatari, Yamato; Ryuichi Arai, Sagamihara; Mamoru Miyawaki, Tokyo; Yukio Masuda, Atsugi; Hitoshi Oda, Yokohama, all of Japan

[73] Assignee: Canon Kabushiki Kaisha, Tokyo, Japan

[21] Appl. No.: 972,732

[22] Filed: Nov. 6, 1992

Related U.S. Application Data

[63] Continuation of Ser. No. 774,656, Oct. 15, 1991, abandoned, which is a continuation of Ser. No. 701,380, May 13, 1991, abandoned, which is a continuation of Ser. No. 85,966, Aug. 14, 1987, abandoned.

[30] Foreign Application Priority Data

| Aug. 15, 1986 | [JP] | Japan | 61-191857 |
| Aug. 15, 1986 | [JP] | Japan | 61-191858 |
| Aug. 15, 1986 | [JP] | Japan | 61-191859 |
| Aug. 26, 1986 | [JP] | Japan | 61-199854 |
| Aug. 26, 1986 | [JP] | Japan | 61-199855 |
| Aug. 26, 1986 | [JP] | Japan | 61-199856 |
| Nov. 6, 1986 | [JP] | Japan | 61-262746 |
| Nov. 7, 1986 | [JP] | Japan | 61-264019 |

[51] Int. Cl.$^5$ .............................................. G11B 9/10
[52] U.S. Cl. .................................... 369/43; 369/101
[58] Field of Search .............. 369/43, 101, 44.37, 369/44.38; 365/118

[56] References Cited

U.S. PATENT DOCUMENTS

| 2,227,401 | 12/1940 | Schlesinger | 358/151 |
| 2,229,556 | 1/1941 | Dumont et al. | 358/151 |
| 3,350,503 | 10/1967 | Gregg | 369/101 |
| 3,749,821 | 7/1973 | Miyauchi et al. | 369/101 X |
| 4,001,493 | 1/1977 | Coal | 369/101 X |
| 4,061,495 | 1/1977 | Cone | 369/101 X |
| 4,495,609 | 1/1985 | Russell | 358/347 X |
| 4,725,736 | 2/1988 | Crewe | 369/101 X |
| 4,760,567 | 7/1988 | Crewe | 369/101 X |
| 4,764,818 | 8/1988 | Crewe | 369/101 X |
| 4,785,187 | 11/1988 | Kariya et al. | 250/491.1 |
| 4,812,662 | 3/1989 | Goto et al. | 250/491.1 |

FOREIGN PATENT DOCUMENTS

| 2048431 | 4/1972 | Fed. Rep. of Germany | 369/101 |
| 54-111272 | 8/1979 | Japan . | |
| 54-030274 | 9/1979 | Japan . | |
| 56-015529 | 2/1981 | Japan . | |
| 57-038528 | 3/1982 | Japan . | |
| 60-29953 | 2/1985 | Japan | 369/101 |
| 60-117433 | 6/1985 | Japan | 369/101 |
| 1456386 | 11/1976 | United Kingdom | 369/101 |
| 1475179 | 6/1977 | United Kingdom | 369/101 |
| 2157876 | 10/1985 | United Kingdom | 369/101 |

OTHER PUBLICATIONS

IBM Tech. Bulletin, vol. 16, No. 4, Sep. 73; Schneider, "Optical Servo Information on Magnetic Recording Discs".
Recording Characteristics of Si-Mos Target for Electron-Beam Memory, Hideki Andoh et al., Shinku, vol. 26, No. 4, pp. 326–329.

Primary Examiner—Donald E. McElheny, Jr.
Attorney, Agent, or Firm—Fitzpatrick, Cella, Harper & Scinto

[57] ABSTRACT

A tracking error signal detecting apparatus includes a device for supplying an electron beam, a device for applying the electron beam to a tracking pattern formed on a recording medium, and a device for forming a tracking error signal on the basis of a signal produced from the tracking pattern upon application of the electron beam. An information recording-reproducing apparatus includes an applying device having a plurality of electron ray sources, a device for controlling the driving of the plurality of electron ray sources in response to a signal, a device for directing the electron rays from the electron ray sources to a recording medium, and a device for reproducing information from signals produced upon application of the electron rays to the recording medium.

38 Claims, 15 Drawing Sheets

TRACKING ERROR SIGNAL DETECTING APPARATUS USING AN ELECTRON BEAM AND APPARATUS FOR EFFECTING RECORDING/REPRODUCTION OF INFORMATION BY THE UTILIZATION OF A PLURALITY OF ELECTRON BEAMS

This application is a continuation of prior application Ser. No. 07/774,656 filed Oct. 15, 1991, which application is a continuation of prior application, Ser. No. 07/701,380 filed May 13, 1991, which application is a continuation of prior application, Ser. No. 07/085,966 filed Aug. 14, 1987, all now abandoned.

BACKGROUND OF THE INVENTION

1. Field of the Invention

The present invention relates to a tracking error signal detecting apparatus using an electron beam which can be utilized in an information recording-reproducing apparatus, or the like.

The present invention also relates to an apparatus for effecting recording/reproduction of information by the utilization of a plurality of electron beams in which electron beams are applied to a recording medium to record information on the recording medium or electron beams are applied to a recording medium having information recorded thereon to reproduce information from the recording medium.

2. Related Background Art

Optical disk devices represented by video disks and optical card devices may be mentioned as typical information recording-reproducing apparatuses. A basic tracking error detecting system used in an optical disk device will hereinafter be described with respect to an example of the prior art shown in FIG. 1 of the accompanying drawings.

In FIG. 1, DSK designates an optical disk on which pits are recorded. Along the optical path of a laser beam emitted from a semiconductor laser LDI, there are disposed a beam slitter BS for directing the reflected light from the optical disk, DSK to a two-division photodetector TDPD, a collimator lens CL, and an objective lens SL for condensing the laser beam into a spot of about 1 $\mu m\phi$ on the optical disk DSK. The two-division photodetector TDPD is provided in the direction of the reflected light by the beam splitter BS, and the output signal thereof may be input to a differential amplifier DA.

In such an arrangement, if a pit PIT on the optical disk DSK is toward the right, with respect to the laser beam spot LBS, as shown in FIG. 2A of the accompanying drawings, the quantity of light received by the left half photodetector TDPDL of the two-division photodetector TDPD will increase, and conversely, if the pit PIT on the optical disk DSK is toward the left, with respect to the laser beam spot LBS as shown in FIG. 2B of the accompanying drawings, the quantity of light received by the right half photodetector TDPDR of the two-division photodetector TDPD will increase. When the pit PIT on the optical disk DSK is properly at the center with respect to the spot LBS as shown in FIG. 2C of the accompanying drawings, the quantities of light received by the left and right photodetectors TDPDL and TDPDR become equal to each other. So, by comparing the two left and right outputs of the two-division photodetector TDPD, the amount of relative positional deviation between the pit PIT and the spot LBS and the direction of the deviation can be detected, and a signal differentially amplified by a differential amplifier DA is used as a tracking error signal TES.

However, in the method of obtaining a tracking error signal by the use of the laser beam represented by this example of the prior art, it is difficult to step down the diameter of the spot LBS to 1 $\mu m\phi$ or less and therefore, it cannot be expected in the future to obtain a tracking error signal TES of higher accuracy. Thus, it is difficult to accomplish highly dense recording in which the track pitch of the optical disk DSK is further reduced from the present order of 2 $\mu m$.

Also, in the method using such a laser beam, use is made of numerous optical parts of high accuracy, including a beam splitter and lenses and therefore, such a method requires a high cost and great volume. Furthermore, generally, the S/N ratio of the tracking error signal TES obtained by such a method is low. Therefore, a relatively high-degree technique is required for signal processing and also, highly accurate positioning of the individual optical parts is necessary. Also, when the laser beam is finally to be minutely moved on the pit PIT, such movement is effected by mechanically moving the optical parts by means of an actuator, and this limits the response frequency, which also forms a great impediment for accomplishing highly accurate tracking.

On the other hand, besides the apparatuses for effecting the recording/reproduction of information by the use of a laser beam, such as optical disk devices, an example of the apparatus for effecting the recording, reproduction and erasing of information by the use of an electron beam is described in a journal Shinku (Vacuum), Vol. 26, No. 4, 1983. The apparatus described in this journal is such that relative to a memory layer comprising an MOS structure, an electron beam is deflected by deflecting means, whereby the electron beam is applied to any pit on the memory layer to thereby accomplish the recording, reproduction and erasing of information. However, this apparatus is not provided with means for determining whether the electron beam is accurately irradiating the designated pit and therefore, cannot accomplish accurate recording, reproduction and erasing.

In addition to the reason set forth above, the use of a single electron beam has made the conventional electron beam memory device unsuitable particularly for providing a great capacity.

SUMMARY OF THE INVENTION

In view of the above-noted problems peculiar to the prior art, it is an object of the present invention to provide a tracking error signal detecting apparatus utilizing an electron beam to accomplish highly accurate tracking.

It is another object of the present invention to provide an apparatus for effecting the recording/reproduction of information by an electron beam which is suitable for a great capacity of information recording or for information reproduction from a great capacity recording medium.

To achieve the first-mentioned object, the tracking error signal detecting apparatus of the present invention is characterized by means for supplying an electron beam, means for directing the electron beam to a tracking pattern formed on a recording medium, and means for forming a tracking error signal from a signal produced from the pattern and corresponding to the relative positional relation between the pattern and the application position of the electron beam.

Also, to achieve the second object, the recording-reproducing apparatus of the present invention is characterized by applying means having a plurality of electron ray sources, means for effecting the drive control of the plurality of electron ray sources in accordance with an information signal and applying an electron beam to a predetermined position on a recording medium, means for causing a plurality of information pits on the recording medium and the plurality of electron ray sources to correspond to one another and applying electron beams to the plurality of information pits, and means for detecting a signal produced from each information pit upon application of the electron beam.

DESCRIPTION OF THE PREFERRED EMBODIMENTS

Figure 1:
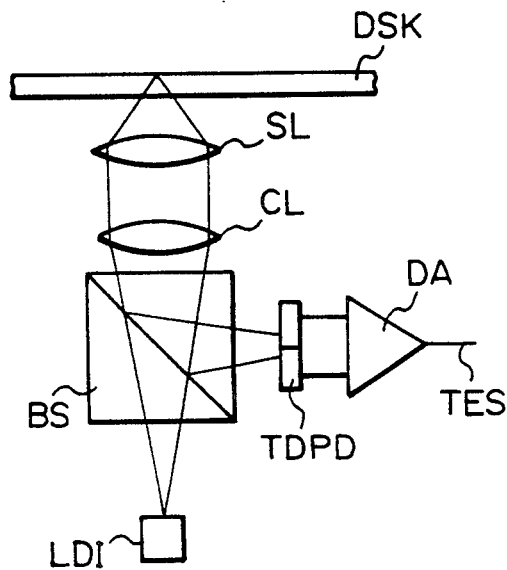
FIGS. 1 and 2A–2C illustrate an example of the tracking error detecting method in a known optical disk device.
Figures 2A, 2B:
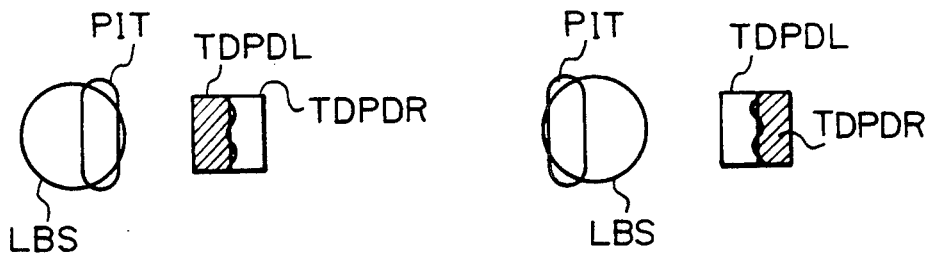
Figure 2C:
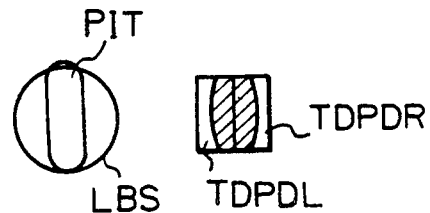
Figure 3:
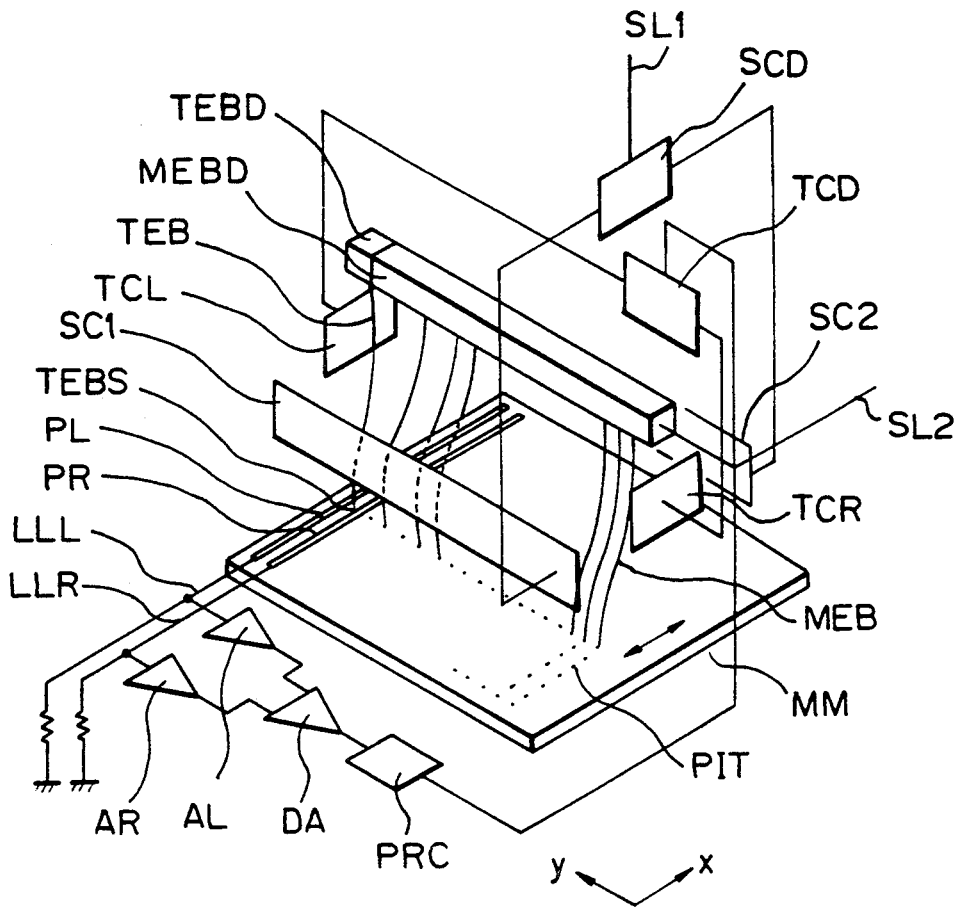
FIG. 3 is a schematic view showing an embodiment of the tracking error signal detecting apparatus of the present invention.

FIG. 3 is a schematic view showing an embodiment of the tracking error signal detecting apparatus of the present invention.

In FIG. 3, MM designate a memory medium on which a plurality of information tracks are formed. A generating source MEBD for generating electron beams MEB for effecting recording, reproduction and erasing of information is disposed above the memory medium. In the present embodiment, the generating source MEBD is an element comprising a plurality of electron beam sources arranged unilaterally with high density and is similar to the form disclosed, for example, in Japanese Patent Examined Publication No. 30274/1979, Japanese Laid-open Patent Application No. 11272/1979, Japanese Laid-open Patent Application No. 15529/1981 or Japanese Laid-open Patent Application No. 38528/1982. The electron beam generating source MEBD can easily vary the current densities of individual electron beams MEB individually. Therefore, during recording or erasing of information, it can enhance the current densities and cause a change in the quality of the material of the memory medium MM, to thereby form any pit PIT on the information tracks or extinguish any pit PIT formed on the information tracks. Also, during the reproduction of information, it can reduce the current densities of the electron beams and reproduce the information on the information tracks by the application of an electron beam without causing any change in the quality of the material of the memory medium MM. The material of the memory medium MM may be Ge(11.5), Te(57.5), As(31), or the like which causes a phase variation of crystallizing the amorphous phase or making crystal amorphous by the application of an electron beam. Also, a tracking electron beam generating source TEBD is provided on a side of the electron beam generating source MEBD, and this generating source TEBD generates a tracking electron beam TEB having a diameter of about 0.2 $\mu m$. The current density of the tracking electron beam TEB in this case is low, to such a degree, that a tracking spot TEBS formed on the memory medium MM does not cause any change in the quality of the material of the memory medium MM.

Further, on the memory medium MM, tracking reference patterns PL and PR comprising two parallel electrical conductors facing in the x direction are provided parallel to the information tracks, and a current may flow through these patterns PL and PR upon the application of the electron beam TEB from the tracking electron beam generating source TEBD, the spacing between the two reference patterns PL and PR being about 0.1 $\mu m$. Lead wires LLL and LLR for leading out current are connected to the reference patterns PL and PR, respectively, and the output current thereof is converted into voltage, and connected to a differential amplifier DA via amplifiers AL and AR, respectively. The differential amplifier DA serves to amplify the difference between the outputs of the amplifiers AL and AR, and by the output thereof, the amount of current flowing through the reference patterns PL and PR is compared with each other. The output from the differential amplifier DA is connected to a driver TCD via a phase compensating circuit PRC. The output of the driver TCD is applied to deflecting electrodes TCR and TCL which produce a uniform electric field for deflecting the tracking electron beam TEB and the plurality of electron beams MEB for the recording, reproduction and erasing of information the same time in the y direction. This driver TCD is adapted to apply a voltage to the deflecting electrodes TCR and TCL in conformity with the output of the differential amplifier DA so that the deflecting electrodes TCR and TCL become positive and negative, respectively, when the current flowing through the reference pattern PL is greater than the current flowing through the reference pattern PR. Conversely, the driver TCD applies a voltage to the respective deflecting electrodes in conformity with the output of the differential amplifier DA so that the deflecting electrodes TCR and TCL become negative and positive, respectively, when the current flowing through the reference pattern PL is smaller than the current flowing through the reference pattern PR. Reference character SCD designates a drive circuit which produces a voltage in response to a signal SL1 from a control circuit, not shown. The output of the drive circuit SCD is connected to deflecting electrodes SC1 and SC2 so as to produce a uniform electric field to deflect the tracking electron beam TEB and the plurality of electron beams MEB for the recording, reproduction and erasing of information at the same time in the x direction (the track direction). A signal SL2 for recording and partial erasing is input to the electron beam generating source MEBD, which thus generates a plurality of electron beams MEB modulated by the signal SL2. Almost all of the components shown in FIG. 3 are contained in a vacuum container, not shown.

Figures 4A, 4B, 4C:
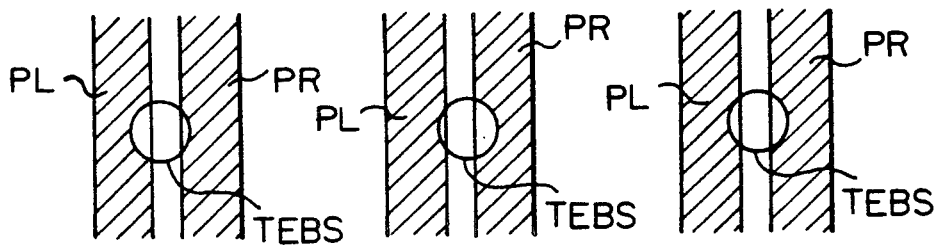
FIGS. 4A–4C illustrate a tracking error signal detecting method using the apparatus shown in FIG. 3.

In such an arrangement, when the tracking beam spot TEBS and the reference patterns PL and PR are in the relation as shown in FIG. 4A, comparison of the current flowing through the reference patterns PL and PR shows that a greater current flows through the reference pattern PL to which a greater, amount of electron beam TEB is applied. Therefore, a voltage is applied so that the deflecting electrodes TCR and TCL become positive and negative, respectively, as previously described, and the tracking electron beam TEB is deflected toward the deflecting electrode TCR side, while the beam spot TEBS moves from the reference pattern PL side to the reference pattern PR side. At this time, the plurality of electron beams MEB for the recording, reproduction and erasing of information are also deflected under the influence of the same electric field as the electric field to which the tracking electron beam TEB is subjected, and are tracked to a predetermined pit position.

On the other hand, when the tracking beam spot TEBS and the reference patterns PL and PR are in the relation as shown in FIG. 4B, the comparison of the current flowing through the reference patterns PL and PR shows that a greater current flows through the reference pattern PR to which a greater amount of electron beam TEB is applied. Therefore, a voltage is applied so that the deflecting electrodes TCR and TCL become negative and positive, respectively, as previously described, and the tracking electron beam TEB is deflected toward the deflecting electrode TCL side, while the beam spot TEBS moves from the reference pattern PR side to the reference pattern PL side. Again at this time, as in the case of FIG. 4A, the plurality of electron beams MEB used for the recording, reproduction and erasing of information are subjected to the same electric field as that to which the tracking electron beam TEB is subjected, and are deflected and tracked to a predetermined pit position.

In the state shown in FIG. 4C, no signal is output from the differential amplifier DA and therefore, no voltage is applied to the deflecting electrodes TCR and TCL, and neither the tracking electron beam TEB, nor the plurality of electron beams MEB are deflected at all.

During the actual recording, reproduction and erasing of information, the voltages of the deflecting electrodes SC1 and SC2 are gradually changed in conformity with the signal SL1, and the spot row produced on the memory medium MM by the plurality of electron beams MEB is moved in the x detection. At this time, regarding the relation between the tracking beam spot TEBS and the reference patterns PL, PR, the states shown in FIGS. 4A, 4B and 4C change continuously Therefore, the position of the beam TEBS spot is controlled by the drive TCD so that the beam spot TEBS is eventually positioned approximately in the state shown in FIG. 4C, i.e., the intermediate position of the reference patterns PL and PR.

In the present embodiment, it is possible to scan the tracking electron beam TEB along the reference patterns PL and PR with high accuracy of 1/10 of the diameter of the beam spot TEBS, i.e., on the order of 0.2 $\mu m\phi$. Thus, the plurality of electron beams MEB subjected to the same electric field as that to which the tracking electron beam TEB is subjected, also effects scanning with the same accuracy as the tracking electron beam TEB, and the pit PIT recorded with the reference patterns PL and PR as the reference can be very accurately traced by scanning the reference patterns PL and PR by the tracking electron beam TEB during reproduction or erasing, as well.

Also, in the present embodiment, not only is the tracking beam the electron beam TEB, but also the beams for effecting the recording, reproduction and erasing of information are the electron beams MEB. Therefore, deflection of the beam can be easily accomplished by means for deflecting the tracking electron beam TEB, and this also leads to the advantage that an actuator necessary for the light beam used in an optical memory device is not required at all. Further, as compared with light beams which are difficult to arrange with high density, electron beams do not individually require deflecting means. Therefore, such beams can be easily made with high density to thereby enable high-speed and high density recording to be accomplished. Also, in the present embodiment, the tracking electron beam generating source TEBD and the plurality of electron beam generating sources MEBD have been described as discrete elements for the convenience of illustration, whereas in an element which generates a plurality of electron beams, it is also possible to adopt a form in which one or more of the electron beams are used for tracking and the remaining electron beams are used for the recording, reproduction and erasing of information.

Although the present embodiment has been described with respect to an example in which the electron beams are deflected by electric fields, it is, of course, possible to obtain the same effect by deflection using magnetic fields.

While the electron beams MEB have been used for the recording, reproduction and erasing of information, light beams may, of course, be used for the recording, reproduction and erasing of information, and since a tracking error signal of very high accuracy and high S/N ratio can be obtained by using the output of the differential amplifier DA as the drive signal of an actuator for the tracking of a so-called optical head, tracking of very high accuracy, which could not heretofore be achieved, becomes possible.

Further, in the above-described embodiment, the electron beams TEB and MEB can be easily deflected in the x direction as viewed in FIG. 3 and therefore, description has been made of an example in which the memory medium MM is not moved, but in the present invention, the traceability with respect to the vibration produced by the memory medium being moved is high. Therefore, for a medium moved or rotated, such as an optical disk or an optical card, the present invention provides more effective tracking error signal detecting means as compared with the conventional tracking method using a light beam. This point will be described later-with reference to another embodiment.

As described above, according to the present invention, the current flowing through the reference patterns comprising electrical conductors on the memory medium upon application of electron beams are detected, whereby the tracking error signal of the beam may be detected. Therefore, signal detection of very high accuracy and high S/N ratio can be obtained and thus, high density recording can be accomplished with the track pitch made narrower.

In the present embodiment, two parallel conductor patterns PL and PR are formed on the memory medium M to detect the tracking error signal, whereas the tracking patterns formed on the memory medium MM may be set to various other forms than that shown herein. Several other forms of tracking patterns will be introduced in another embodiment which will be described later. On the basis of the present invention, if the relative position of the application position of the electron beams to the tracking patterns can be recognized, the tracking error signal can naturally be detected. Accordingly, other forms of tracking patterns than those mentioned herein could be readily conceived by those skilled in the art.

Figure 5:
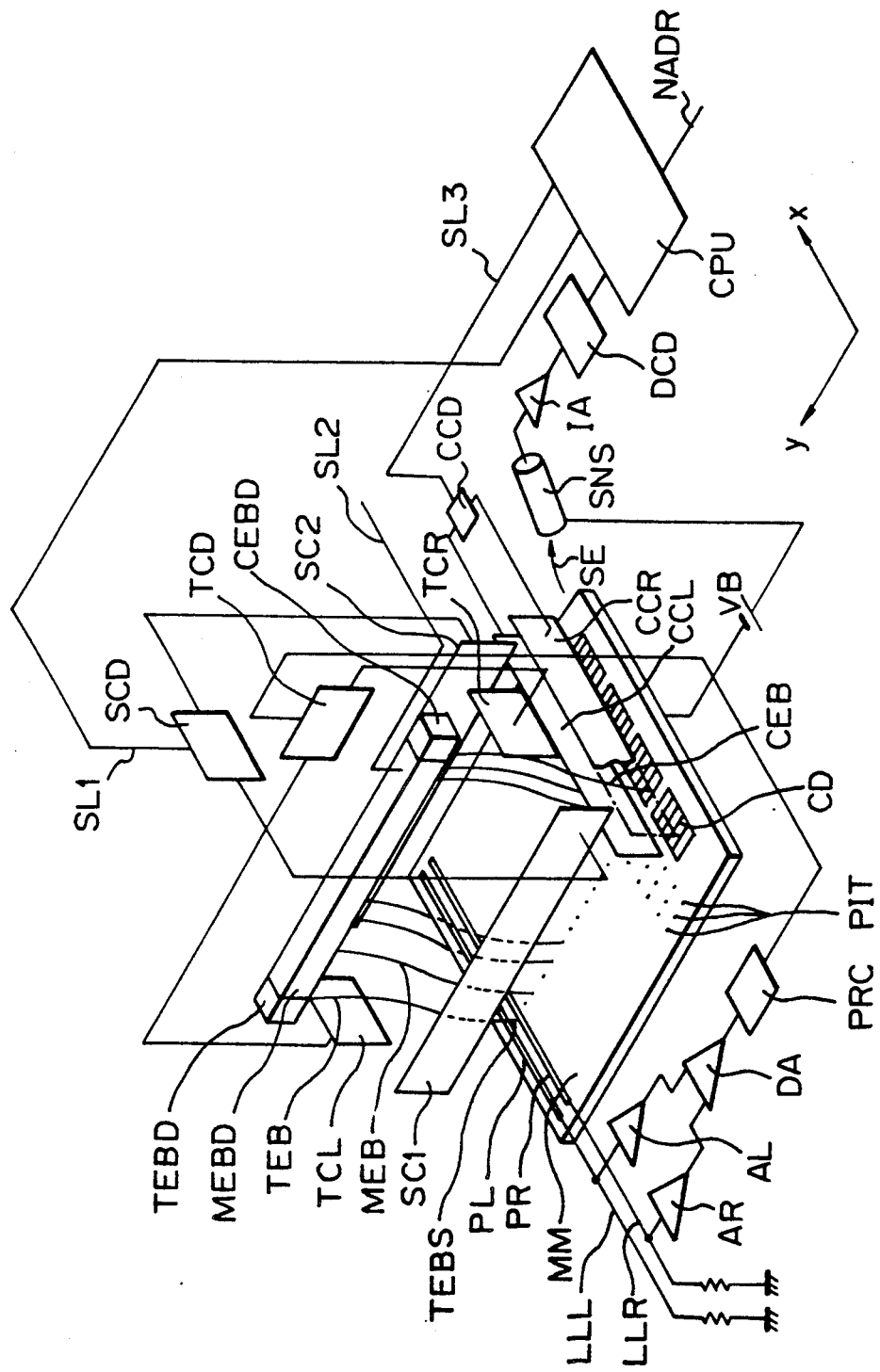
FIG. 5 is a schematic view showing another embodiment of the tracking error signal detecting apparatus of the present invention.

FIG. 5 is a schematic view showing another embodiment of the tracking error signal detecting apparatus according to the present invention.

In FIG. 5, MM designates a recording medium above and disposed is a generating source MEBD for generating electron beams MEB for effecting the recording, reproduction and erasing of information. The generating source MEBD is an element comprising a plurality of electron beam sources arranged unilaterally with high density, and is similar to the form of the generating source MEBD in the embodiment shown in FIG. 3. The electron beam generating source MEBD can easily vary the current densities of individual electron beams MEB. Therefore, during the recording or erasing of information, it can enhance the current densities and cause a change in the quality of the material of the recording medium MM, to thereby form any pit PIT on the information tracks or extinguish any pit PIT formed on the information tracks. Also, during the reproduction of information, it can reduce the current densities and reproduce the information without causing any change in the quality of the material of the recording medium MM. The material of the recording medium MM may be Ge(11.5), Te(57.5), As (31) or the like which causes a phase variation of crystallizing the amorphous phase or making crystal amorphous by the application of an electron beam.

Also, a tracking electron beam generating source TEBD is provided on a side of the electron beam generating source MEBD, and this generating source TEBD generates a tracking electron beam TEB. An address code reading electron beam generating source CEBD is provided on the side opposite to the tracking electron beam generating source TEBD with respect to the electron beam generating source MEBD, and this generating source CEBD generates an address code reading electron beam CEB. Each of the electron beams MEB, TEB and CEB has a diameter on an order of 0.2 $\mu$m, and the current densities of the tracking electron beam TEB and the address code reading electron beam CEB are made low to such a degree that a tracking spot TEBS and an address code reading spot CEBS formed on the recording medium MM do not cause a change in the quality of the material of the recording medium MM.

Further, tracking reference patterns PL and PR comprising two parallel electrical conductors facing in the x direction are provided on the recording medium MM and current may flow through these patterns PL and PR upon application of the electron beam TEB from the tracking electron beam generating source TEBD, the spacing between the two reference patterns PL and PR being about 0.1 $\mu$m. Lead wires LLL and LLR for leading out current are connected to the reference patterns PL and PR, respectively, and the output currents thereof are converted into voltages, and are connected to a differential amplifier DA via amplifiers AL and AR, respectively. The differential amplifier DA serves to amplify the difference between the outputs of the amplifiers AC and AR, and by the output thereof, the amounts of current flowing through the reference patterns PL and PR are compared with each other. The output from the differential amplifier DA is connected to a driver TCD via a phase compensating circuit PRC. The output of the driver TCD is applied to deflecting electrodes TCR and TCL which produce a uniform electric field for deflecting the tracking electron beam TEB and the plurality of electron beams MEB for the recording, reproduction and erasing of information at one time in the y direction. This driver TCD is adapted to apply a voltage to the deflecting electrodes TCR and TCL in conformity with the output of the differential amplifier DA so that the deflecting electrodes TCR and TCL become positive and negative, respectively, when the current flowing through the reference pattern PL is greater than the current flowing through the reference pattern PR. Conversely, the driver TCD applies a voltage to the respective deflecting electrodes in conformity with the output of the differential amplifier DA so that the deflecting electrodes TCR and TCL become negative and positive, respectively, when the current flowing through the reference pattern PL is smaller than the current flowing through the reference pattern PR. Also, an address code CD formed by a method such as by gold evaporation and facing substantially in the x direction is provided on the recording medium MM.

A signal SL1 may be supplied from a control circuit CPU to a driver SCD, which thus may drive deflecting electrodes SC1 and SC2 for deflecting the tracking electron beam TEB, the plurality of electron beams MEB and the address code reading electron beam CEB in the x direction. Also, deflecting electrodes CCR and CCL are provided to deflect the address code reading electron beam CEB in the y direction, and these deflecting electrodes CCR and CCL are driven by a driver CCD in accordance with a signal SL3 output from the control circuit CPU. Further, obliquely above the information of the address code CD, there is provided a secondary electron detector SNS between which and the memory medium MM, a potential VB is applied, and the output thereof is input to the control circuit CPU through an amplifier IA and a decoder DCD. Almost all of the components shown in FIG. 5 are contained in an electromagnetically shielded vacuum container (not shown).

Figure 6:
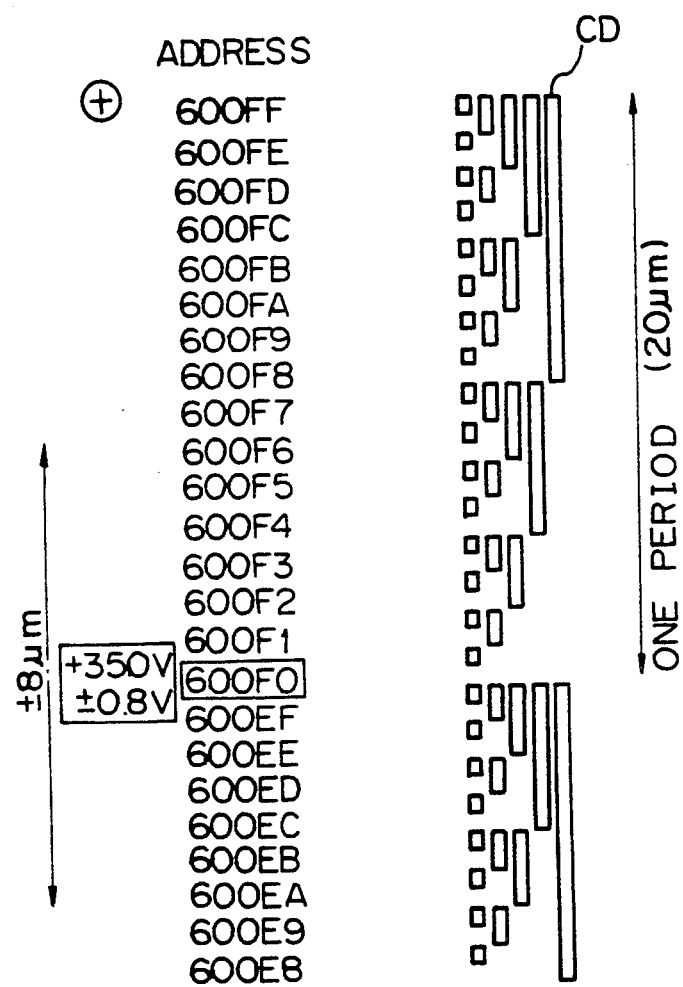
FIG. 6 shows one form of the address code formed on the recording medium shown in FIG. 5.

When feedback is not applied by an open loops but the voltage is directly controlled to thereby deflect the electron beams, the positioning accuracy of the electron beam spot is governed by the influences of the accuracy of the driver TCD, the resolving power, the external magnetic field, etc. and thus, the position of the electron beam spot on the recording medium MM has a certain range of error. However, the address code CD is depicted so that the same address code group is repeated at a cycle somewhat longer than range of error. For example, if as shown in FIG. 6, the effective length of the record in the x direction on the recording medium MM is 10 mm and the range of voltage applied to deflecting electrodes SC1 and SC2 for deflecting the electron beam CEB to said 10 mm is $\pm 500$ V and the resolving power and accuracy of the driver TCD for applying a voltage to the deflecting electrodes SC1 and SC2 are 0.1% of the dynamic range, namely, $\pm 0.5$ V to the full scale of $\pm 500$ V and the other error component is $\pm 0.3$ V in terms of voltage, then there is present a voltage error of $\pm 0.8$ V in all. This means that for the effective length of the record of 10 mm, there is a range of error of $\pm 8$ $\mu$m on the recording medium MM, and therefore, the address code group is repetitively depicted at a cycle longer than this range of error, e.g., a cycle of 20 $\mu$m.

When the address code reading electron beam CEB is caused to irradiate the address code CD by an electric field applied between the deflecting electrodes CCL and CCR by the driver CCD, secondary electron SE are emitted from the surface of the recording medium MM or from the address code CD by the application of the electron beam CEB. This secondary electron SE is directed by a voltage VB of 200-500 V to a secondary electron detector SNS comprised of a scintillator, an optical pipe and an optical electron multiplier. Generally, a high-speed reflected electron has its orbit hardly bent by an electric field provided by such low voltage and is reflected to the vicinity of the direction of incidence. Therefore, the secondary electron detector SNS is disposed at a position to avoid this. The output signal from the secondary electron detector SNS is amplified by the amplifier IA and passes through the decoder DCD, and the read signal code is converted into an address. This address is input to the control circuit CPU, which interprets this address and delivers a signal SL3 to the driver CCD for scanning the address code reading electron beam CEB, and delivers a signal SL1 to the driver SCD for deflecting all the electron beams in the x direction by applying a voltage between the deflecting electrodes SC1 and SC2. Also, an access command NADR to a new address is supplied to the control circuit CPU from a control circuit of greater significance.

In such an arrangement, when the tracking beam spot TEBS and the reference patterns PL, PR are in the relation as shown in FIG. 4A, the comparison of the currents flowing through the reference patterns PL and PR shows that a greater current flows through the reference pattern PL to which a greater amount of the electron beam TEB is applied. Therefore, a voltage is applied so that the deflecting electrodes TCR and TCL become positive and negative, respectively, as previously described, and the tracking electron beam TEB is deflected toward the deflecting electrode TCR side and the beam spot TEBS moves from the reference pattern PL side to the reference pattern PR side. At this time, the plurality of electron beams MEB for the recording, reproduction and erasing of information and the address code reading electron beam CEB are also deflected under the influence of the same electric field as the electric field to which the tracking electron beam TEB is subjected.

On the other hand, when the tracking beam spot TEBS and the reference patterns PL and PR are in the relation as shown in FIG. 4B, the comparison of the currents flowing through the reference patterns PL and PR shows that a greater current flows through the reference pattern PR to which a greater amount of the electron beam TEB is applied. Therefore, a voltage is applied so that the deflecting electrodes TCR and TCL become negative and positive, respectively, as previously described, and the tracking electron beam TEB is deflected toward the deflecting electrode TCL side and the beam spot TEBS moves from the reference pattern PR side to the reference pattern PL side.

Again at this time, as in the case of FIG. 4A, the plurality of electron beams MEB used for the recording, reproduction and erasing of information and the address code reading electron beam CEB are deflected under the influence of the same electric field as that to which the tracking electron beam TEB is subjected.

In the state shown in FIG. 4C, no signal is output from the differential amplifier DA and therefore, no voltage is applied to the deflecting electrodes TCR and TCL, and neither the tracking electron beam TEB, nor the plurality of electron beams MEB and the address code reading electron beam CEB are deflected at all.

The states of FIGS. 4A, 4B and 4C are appropriately controlled and the tracking spot TEBS is maintained so as to assume a position intermediate of the reference patterns PR and PL, i.e., the state of FIG. 4C.

In the present embodiment, it is possible to scan the tracking electron beam TEB along the reference patterns PL and PR with the accuracy of 1/10 of the diameter of the beam spot TEBS, i.e., the accuracy of the order of 0.2 $\mu$m$\phi$. Thus, the plurality of electron beams MEB are subjected to the same electric field as that to which the tracking electron beam TEB is subjected and the address code reading electron beam CEB are also scanned with the same accuracy as the tracking electron beam TEB, and the pit PIT recorded with the reference patterns PL and PR as a reference can be traced very accurately by scanning the reference patterns PL and PR by the tracking electron beam TEB during reproduction or erasing as well.

When the access command NADR to a new address is brought to the control circuit CPU under such tracking control, the control circuit CPU immediately instructs the driver SCD to apply a voltage for imparting to all electron beams TEB, MEB and CEB a deflection corresponding to a new address value between the deflecting electrodes SC1 and SC2. For example, if the new address value is 600F0 and the voltage corresponding thereto is 350 V, the driver SCD applies 350 V between the deflecting electrodes SC1 and SC2, but actually, as previously described, there is 16/20=0.8 V of one period of the address code for a maximum error. Describing this with FIG. 6 taken as an example, even if 350 V is applied, the electron beam CEB is in the range of 600EA to 600F6, but there is no assurance that 600F0 is directly accessed. So, the control circuit CPU subsequently instructs the driver CCD to apply a voltage between the deflecting electrodes CCL and CCR so that the address code reading electron beam CEB scans the address code CD. The secondary electron SE emitted by the scanning of the electron beam CEB is detected by the secondary electron detector SNS and is converted into an address value by the decoder DCD, but in the example of FIG. 6, there are only sixteen kinds of code which correspond to the address values 0 to F. For example, if an address value of C is obtained from the decoder DCD, the control circuit CPU interprets that the address is 600EC, and causes the driver SCD to apply a voltage $\Delta V$ between the deflecting electrodes SC1 and SC2 and deflect the electron beam CEB toward 600 F0. The reason why the control circuit CPU which has received the address value C as the input from the decoder DCD interprets that the address is 600EC and does not mistake that the address is 600FC is that, since the repetition cycle of the address code CD is longer than the range of the positioning error of the electron beam, the possible addresses are 600EA–600F6 and do not include 600FC when 350 V is applied with FIG. 6 taken as an example.

Also, in the present embodiment, not only is the tracking beam the electron beam TEB, but also the beams MEB for effecting the recording, reproduction and erasing of information and the, address code reading beam CEB are electron beams. Therefore, deflection of the beams can be easily accomplished by means for deflecting the tracking electron beam TEB. Further, the electron beams individually do not require deflecting means and therefore, it is easy to arrange a plurality of electron beams with high density and it is possible to make the beams with high density and accomplish high-speed and high density recording. Also, in the present embodiment, the tracking electron beam generating source TEBD, the plurality of electron beam generating sources MEBD and the address code reading electron beam generating source CEBD have been described as discrete elements for the convenience of description, but in an element which generates a plurality of electron beams, it is also possible to adopt a form in which one or several electron beams are used for tracking. Further one or several electron beams are used for address code reading and the remaining electron beams are used for the recording, reproduction and erasing of information.

While the present embodiment has been described with respect to an example in which the electron beams are deflected by an electric field, of course, the same effect can also be provided by the deflection using a magnetic field.

As described above, according to the present invention, two operations, i.e., the voltage application by an open loop and the address code reading, are effected in succession, whereby high-speed and highly accurate address access, which could not be achieved by the prior art, becomes possible. Also, design is made such that the address code on the recording medium is repetitively used at a certain cycle and therefore, the length of the address code is short. This also leads to the effect that the address code reading time can be shortened and the space occupied by the address code on the recording medium can be decreased.

Figure 7:
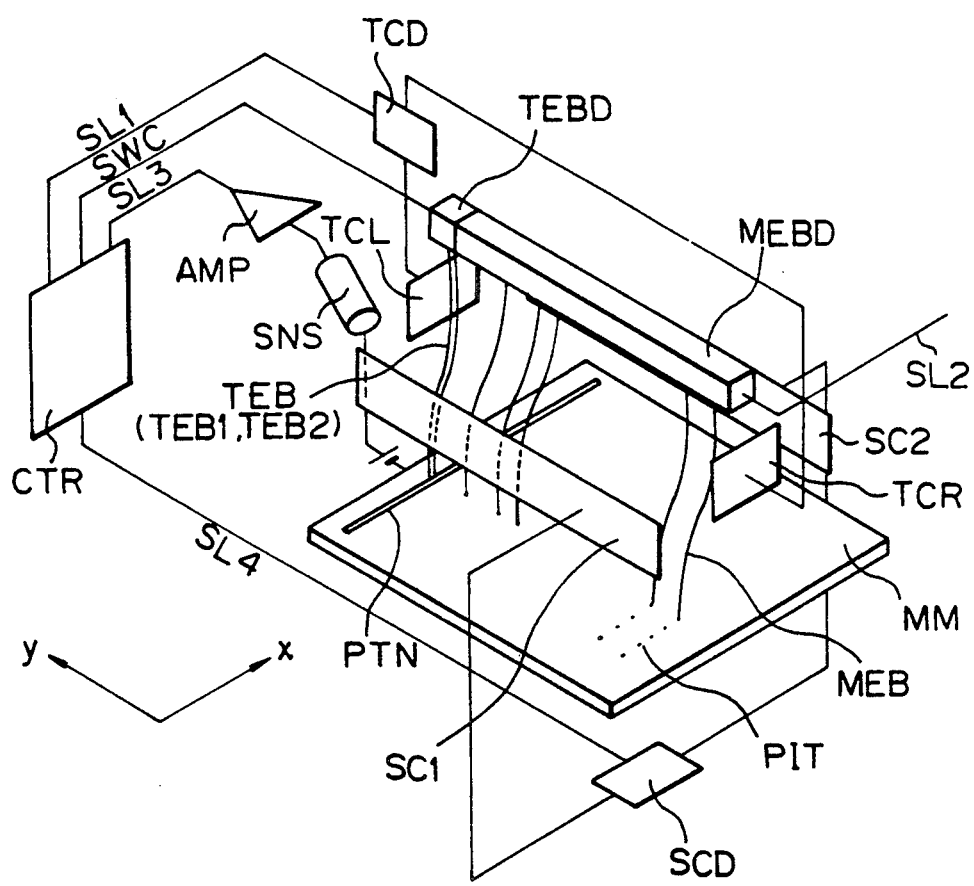
FIG. 7 shows still another embodiment of the tracking error signal detecting apparatus of the present invention.

FIG. 7 is a schematic view showing still another embodiment of the tracking error signal detecting apparatus according to the present invention.

In FIG. 7, MM designates a recording medium above and disposed is a generating source MEBD for generating electron beams MEB for effecting the recording, reproduction and erasing of information. The generating source MEBD is an element comprising a plurality of electron beam sources arranged unilaterally with high density, and is similar to the form of the generating source MEBD shown in the previously described embodiment. The electron beam generating source MEBD can easily vary the current densities of individual electron beams MEB and therefore, during the recording or erasing of information, it can enhance the current densities and cause a change in the quality of the material of the recording medium MM, to thereby form any pit PIT on the information tracks or extinguish any pit PIT formed on the information tracks. Also, during the reproduction of information, it can reduce the current densities and reproduce the information without causing a change in the quality of the material of the recording medium MM. The material of the recording medium MM may be Ge (11.5), Te (57.5), As (31) or the like which causes a phase variation of crystallizing the amorphous phase or making the crystal amorphous by the application of an electron beam.

A tracking electron beam generating source TEBD is provided on a side of the electron beam generating source MEBD, and this generating source TEBD generates a tracking electron beam TEB having a diameter of about 0.2 $\mu$m. The tracking electron beam TEB is comprised of two electron beams TEB1 and TEB2 which are controlled so as to be alternately generated for a time t1, each by a signal SWC supplied from a control circuit CTR and are not generated at the same time. The current density of the tracking electron beam TEB is low to such a degree that a tracking spot TEBS formed on the recording medium MM does not cause a change in the quality of the material of the recording medium MM.

Further, on the recording medium MM, there are provided a tracking reference pattern PTN formed of a material differing from the material of the recording medium MM and facing in the x direction. The material of the reference pattern PTN may be any one which differs from the recording medium MM in the amount of secondary electrons generated by the application of the electron beam TEB; such as copper, silver or palladium which emits a great amount of secondary electrons. In the present embodiment, the reference pattern PTN is formed by vapor-depositing it to a width of 1 $\mu$m and a thickness of 0.2 $\mu$m linearly in the x direction on the recording medium MM. The secondary electron generated by applying to the reference pattern PTN two tracking electron beam spots TEBS1 and TEBS2 slightly deviated from each other widthwisely of the reference pattern PTN is directed to a secondary electron detector SNS by an electric field formed by a voltage VB of 200–500 V. Generally, a high-speed reflected electron has its orbit hardly bent in an electric field formed by a low voltage VB, but enters the vicinity of the direction of incidence and therefore, the secondary electron detector SNS is disposed at a position to avoid this. The output signal of the secondary electron detector SNS is amplified by an amplifier AMP and becomes a signal SL3, which is input to the control circuit CTR, and the state of application of the electron beam TEB to the reference pattern PTN may be judged by the control circuit CTR.

A tracking signal SL1 is input from the control circuit CTR to a driver TCD, which applies a voltage between deflecting electrodes TCL and TCR in response to the signal SL1 to thereby form a deflecting electric field which may deflect the electron beams TEB and MEB at the same time. Also, a control signal SL4 from the control circuit CTR is input to a driver SCD, which applies a voltage between deflecting electrodes SC1 and SC2 in response to the signal SL4 which may deflect the electron beams TEB and MEB in the x direction at the same time. Further, SL2 designates a signal for recording and partial erasing, and the electron beams MEB generated by the electron beam generating source MEBD are modulated by the signal SL2. Almost all of the components shown in FIG. 7 are contained in an electromagnetically shielded vaccum container.

Figure 8A:
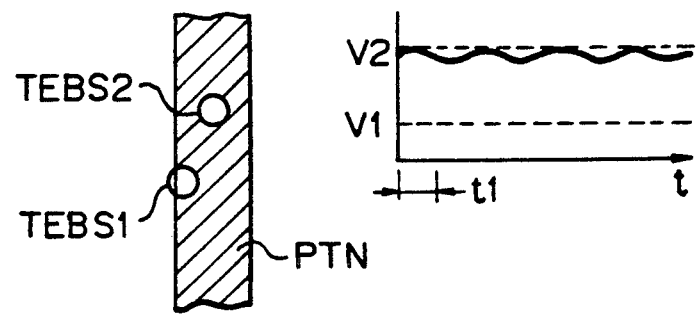
FIGS. 8A–8C and 9 illustrate a tracking error signal detecting method using the apparatus shown in FIG. 7.
Figure 8B:
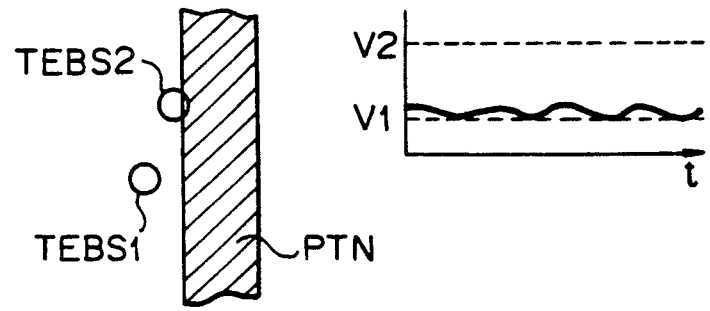
Figure 8C:
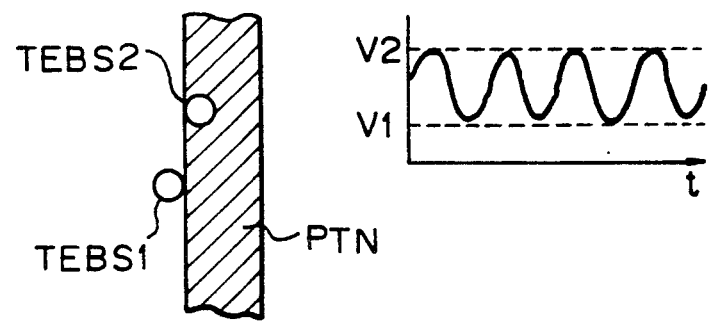

Description will now be made of a case in which the spots TEBS1 and TEBS2 of the two tracking electron beams TEB1 and TEB2 and the reference pattern PTN are in the relation as shown in FIG. 8A. The right-hand graphs of FIGS. 8A-8C are graphs in which the relation between the tracking electron beam spots TEBS1, TEBS2 and the reference pattern PTN is shown with the output signal SL3 of the amplifier AMP as the ordinate and with time as the abcissa. As previously described, the tracking electron beams TEBS1 and TEBS2 are alternately generated for each time t1, but in the case of FIG. 8A, the two tracking electron beam spots TEBS1 and TEBS2 are both applied to the reference pattern PTN of silver or palladium and therefore, there is generated a great amount of secondary electrons and the output signal SL3 becomes substantially constant at a high level V2.

On the other hand, in the case of FIG. 8B, the two tracking electron beam spots TEBS1 and TEBS2 are both applied to the recording medium MM in which a relatively small amount of secondary electrons is generated and therefore, the output signal SL3 becomes substantially constant at a low level V1. Also, in the case of FIG. 8C, the tracking electron beam spot TEBS1 is applied to the recording medium MM and the tracking electron beam spot TEBS2 is applied to the reference pattern PTN. Therefore, when the tracking electron beam TEB1 is generated, the amount of generated secondary electrons is small, and conversely, when the tracking electron beam TEB2 is generated, the amount of generated secondary electrons increases, and the output signal SL3 goes up and down between the levels V1 and V2 and assumes a sine-like wave form of period 2.t1.

Figure 9:
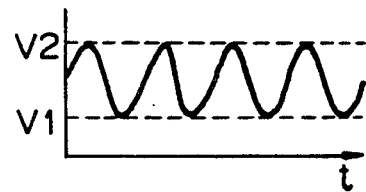

A comparator is provided in the control circuit CTR and a comparison signal of the same phase as in the case of FIG. 8, as shown in FIG. 9, is imparted to the comparator and is compared with the output signal SL3 so that in the case of FIG. 8A, a negative output may be provided and in the case of FIG. 8B, a positive output may be provided and in the case of FIG. 8C, the output may be 0, because the two signals are the same. When this output having a sign is applied as the tracking signal SL1 to the driver TCD, if the tracking signal SL1 is negative, the driver TCD applies a voltage to deflecting electrodes TCL and TCR so that in conformity with the magnitude of the tracking signal SL1, the tracking beam spots TEBS1 and TEBS2 move leftwardly as viewed in FIGS. 8A-8C, and if the tracking signal SL1 is positive, the driver TCD applies a voltage to the deflecting electrodes TCL and TCR so that in conformity with the magnitude of the signal, the tracking beam spots TEBS1 and TEBS2 move rightwardly as viewed in FIGS. 8A-8C. At this time, not only the tracking electron beam TEB, but also the plurality of electron beams MEB used for the recording, reproduction and erasing of information are subjected to the same electric field as that to which the tracking electron beam TEB is subjected, and are deflected thereby. Also, when the tracking signal SL1 is 0, the driver TCD applies no voltage to the deflecting electrodes TCL and TCR and neither the tracking electron beam TEB, nor the plurality of electron beams MEB are deflected at all.

During the actual recording, reproduction and erasing of information, the voltages of deflecting electrodes SC1 and SC2 are gradually varied by the driven SCD and the spot row produced on the recording medium MM by the plurality of electron beams MEB is moved in the x direction. At this time, the relation between the tracking beam spots TEBS1, TEBS2 and the reference pattern PTN is eventually controlled to the state of FIG. 8C, that is, so that one side edge of the reference pattern PTN is located at a position intermediate the tracking beam spots TEBS1 and TEBS2, because the states shown in FIGS. 8A, 8B and 8C change continuously.

In the present embodiment, it is possible to scan the tracking electron beam TEB along the reference pattern PTN with the high accuracy of 1/10 of the diameter of the beam spot TEBS, i.e., of the order of 0.02 μm. Thus, the plurality of electron beams MEB are subjected to the same electric field as that to which the tracking electron beam TEB is subjected, also effect scanning at the same accuracy as the tracking electron beam TEB, and the pit PIT recorded with the reference pattern PTN as the reference scans the reference pattern PTN by the tracking electron beam TEB, whereby it becomes possible to trace the reference pattern very accurately.

In the present embodiment, not only is the tracking beam the electron beam TEB, but also the beams used for the recording, reproduction and erasing of information are the electron beams MEB. Therefore, the electron beams MEB can be easily deflected by means for deflecting the tracking electron beam TEB, and this also leads to the advantage that an actuator which would otherwise be required for a light beam is not required at all. Further, as compared with a plurality of light beams which are difficult to arrange with high density, electron beams individually do not require deflecting means and therefore can easily be made with high density and thus, high-speed and high density recording becomes possible. Also, in the present embodiment, the tracking electron beam generating source TEBD and the plurality of electron beam generating sources MEBD have been described as discrete elements for the convenience of description, but in an element which generates a plurality of electron beams, it is also possible to adopt a form in which one or several electron beams are used for tracking and the remaining electron beams are used for the recording, reproduction and erasing of information.

While the electron beams MEB are used for the recording, reproduction and erasing of information, light beams may, of course be used for the recording, reproduction and erasing of information, and by using the tracking signal SL1 as a drive signal for the tracking actuator of a so-called optical head, it becomes possible to obtain a tracking error signal of very high accuracy and high S/N ratio and thus, tracking of high accuracy which could not heretofore be achieved, becomes possible.

Further, in the above-described embodiment, the electron beams TEB and MEB can be easily deflected in the x direction as viewed in FIG. 7 and therefore, description has been made of an example in which the recording medium MM is not moved, but in the present invention, the traceability with respect to the vibration produced by the recording medium being moved is high. Therefore, for a medium moved or rotated, such as an optical disk or an optical card, the present invention makes more effective detection of the tracking error signal as compared with the conventional tracking method using a light beam. Also, in the present invention, the recording medium and the secondary electron detector, which is a tracking error signal detecting element, are not in contact with each other and therefore, the present invention is particularly effective for a rotated or moved recording medium, such as an optical disk or an optical card.

While the present embodiment has been described with respect to an example in which electron beams are deflected by electric fields, the same effect can, of course, be obtained by deflection using magnetic fields. The number of the tracking electron beams EB is not limited two, but may be one or three or more.

As described above, according to the present invention, a reference pattern of a material differing from the material of the recording medium is formed on the recording medium and a secondary electron emitted upon application of an electron beam to the reference pattern is used as means for detecting the tracking error signal. Therefore, a signal of very high accuracy and high S/N ratio can be obtained and thus, it becomes possible to narrow the track pitch and accomplish high density recording.

Figure 10:
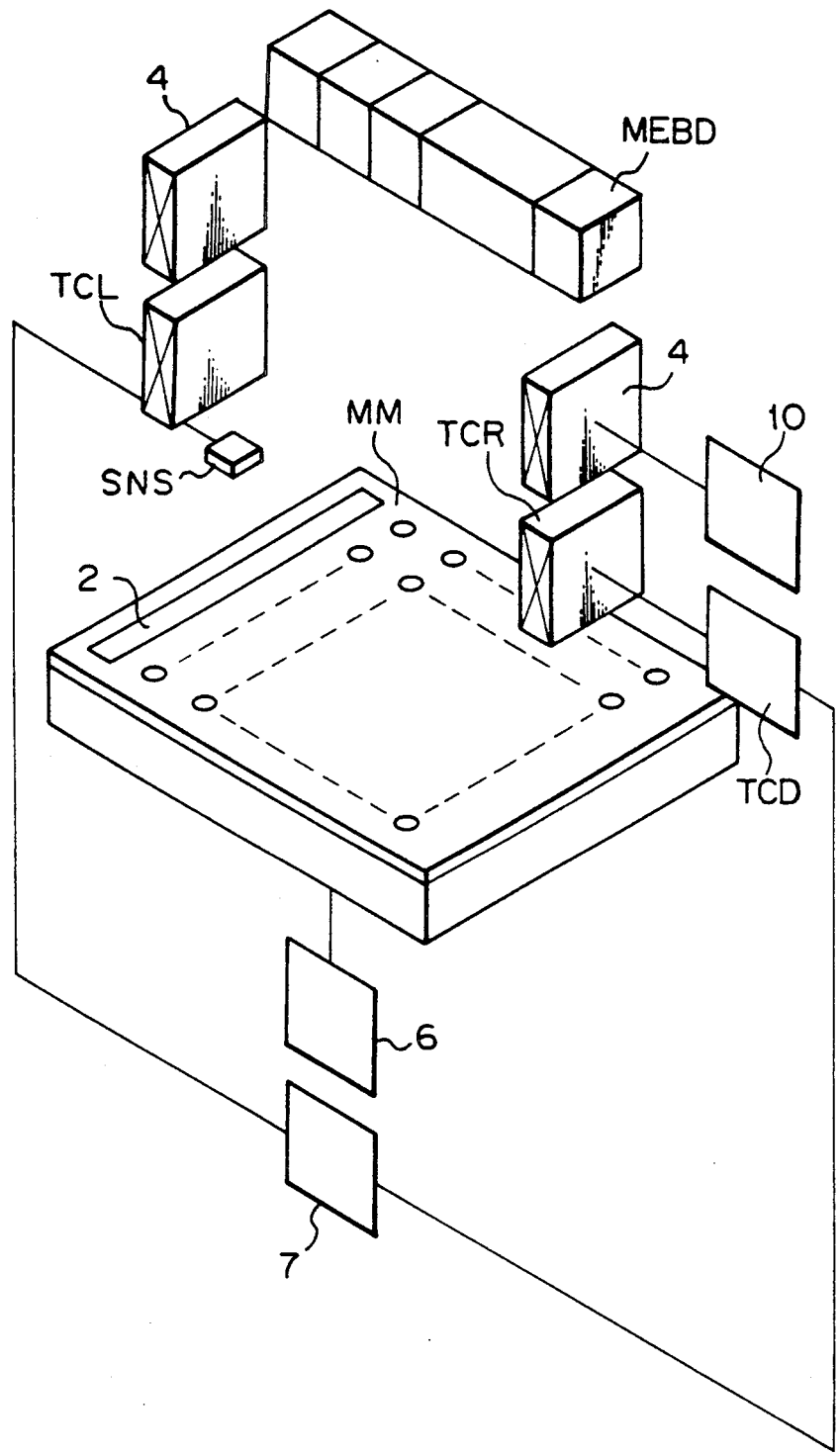
FIG. 10 is a schematic view showing yet still another embodiment of the tracking error signal detecting apparatus of the present invention.

FIG. 10 is a schematic view showing yet still another embodiment of the tracking error signal detecting apparatus according to the present invention. In FIG. 10, MM designates a planar recording medium on the upper surface of which there is a portion recorded by an electron beam and there is further a tracking error signal detecting groove 2 formed by etching. Above the recording medium MM, there is disposed a solid electron ray source MEBD for generating a number of electron beams, and focusing electromagnetic lenses 4 for focusing a plurality of electron beams and deflecting electromagnetic lenses TCL and TCR are provided on both sides between the solid electron ray source MEBD and the recording medium MM. Reference numeral 6 designates a signal processing unit for processing the signal from the recording medium MM, and reference numeral 7 denotes a control unit for deflecting the electron beams. The control unit 7 is adapted to control a drive control device TCD for the deflecting electromagnetic lenses TCL and TCR on the basis of the signal from a detector SNS for detecting secondary electrons generated when an electron beam is applied to the tracking error signal detecting groove 2. Reference numeral 10 designates a drive control device for the focusing electromagnetic lenses 4.

Figure 11A:
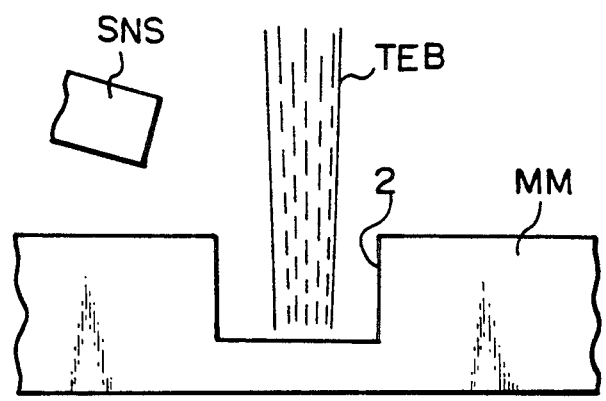
FIGS. 11A and 11B illustrate the tracking error detecting method in the apparatus shown in FIG. 10.
Figure 11B:
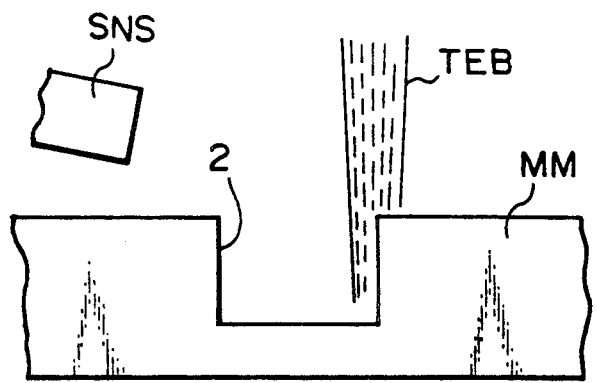

In such an arrangement, the electron beams emitted from the solid electron ray source MEBD are focused by the focusing electromagnetic lenses 4 and are deflected toward a desired recording position by the deflecting electromagnetic lenses TCL and TCR. One of the electron beams is used exclusively for detecting the tracking error signal and may irradiate the tracking error signal detecting groove 2. The time when this electron beam and the tracking error signal detecting groove 2 are in the relation as shown in FIG. 11A is a state in which tracking is taken, and the time when as shown in FIG. 11B, the electron beam irradiates a position deviated from the tracking error signal detecting groove 2 is a state in which tracking is not taken. Also, in the case of recording, the remaining electron beams are applied toward a plurality of recording positions and modulated in conformity with an information signal.

Generally, in the secondary electron image in SEM (scanning electron micrograph) observation, there is known the edge effect that the detected amount of secondary electrons is great at the end of a sample or at the corner of a convex portion and such end or corner shines bright, but in the state of FIG. 11B, secondary electrons are emitted not only from the surface, but also from the sides. Therefore, as compared with the state of FIG. 11A, the detected amount of secondary electrons is increased. Accordingly, the detected amount of secondary electrons differs greatly depending on whether tracking is taken, and when the signal from the electron detector SNS is fed back to regulate the deflection of the electron beams by the deflecting electromagnetic lenses SCL and SCR through the control unit 7 and the drive control device TCD to ensure the state of FIG. 11A to be assumed, the remaining electron beams are also subjected to the same deflection as that to which the tracking error signal detecting electron beam is subjected and therefore, all electron beams can be brought into accurate coincidence with the respective recording positions.

Figure 12A:
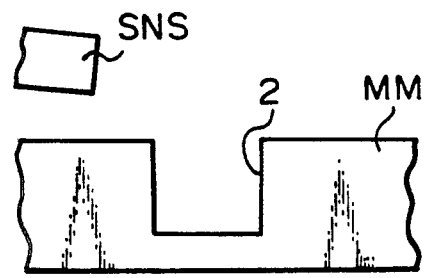
FIGS. 12A–12C schematically show modifications of the tracking error detecting groove shown in FIG. 10.
Figure 12B:
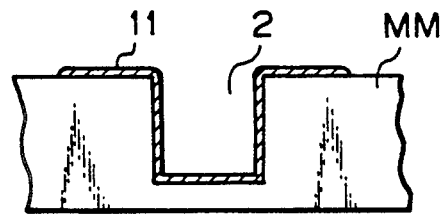
Figure 12C:
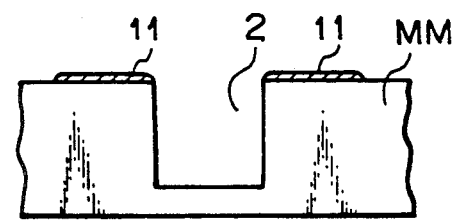

FIGS. 12A–12C show some forms of the tracking error signal detecting groove 2. FIG. 12A shows a groove 2 formed in the surface of the recording medium MM by etching. In FIG. 12B, the inner surface of a groove 2 similar to that of FIG. 12A is coated with a substance 11 higher in secondary electron emission efficiency for the application of the electron beam TEB than the surface of the recording medium MM, by the use of the vapor deposition method or the sputtering method. When the groove 2 shown in FIG. 12B is used, the amount of emitted secondary electrons is greater than when the groove 2 shown in FIG. 12A is used and therefore, a tracking signal of high S/N ratio can be obtained. Further, the tracking error signal detecting groove 2 shown in FIG. 12C is coated with a substance of high secondary electron emission effect only on the outer edge of the groove 2, and of course, in this case, a similar effect can be obtained.

That is, in the state in which tracking is taken as shown in FIG. 11A, the amount of emitted secondary electrons is small, and in the state in which tracking is not taken as shown in FIG. 11B, the electron beam TEB is applied to the substance 11 of high secondary electron emission effect and thus, the amount of emitted secondary electrons is greater and a tracking signal of higher S/N ratio is obtained than when the substance 11 is not used.

Also, in the above-described embodiment, the cross-sectional shape of the groove 2 is square, but alternatively, may be any cross-sectional shape, such as a circle, a semi-ellipse or a triangle That is, if the end portions of the groove 2 are of a very sharp shape, the amount of emitted secondary electrons in those portions will become greater than in the inner and outer planar portions of the groove 2 and therefore, any crosssectional shape of the groove may result in obtainment of a similar effect.

Figure 13A:
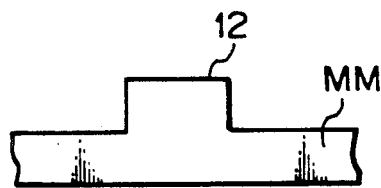
FIGS. 13A and 13B schematically show further examples of the tracking error detecting pattern.
Figure 13B:
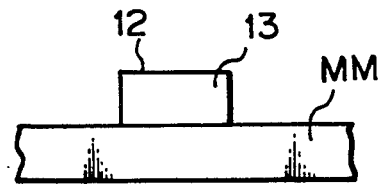

Further, the edge portion of this groove may be a convex end portion as shown in FIG. 13A. That is, the difference between the amount of secondary electrons detected with an electron beam being applied to the upper surface of the convex portion 12 of the recording medium MM, instead of the groove 2, and the amount of secondary electrons detected with an electron beam being applied to the edge of the convex portion 12 may be utilized as the tracking signal. In this case, the convex portion 12 may be formed by etching, or may be formed by cementing a material 13 of different secondary electron emission rate in the manner as shown in FIG. 13B, or may be formed as a thin film, and as in the case of FIGS. 12A-12C, there is obtained a tracking signal of high S/N ratio.

As described above, according to the present invention, in a high-density recording system using a plurality of electron beams, one electron beam is used for the detection of the tracking signal and therefore, focusing and deflecting electromagnetic lenses can be controlled and the positions of the remaining electron beams for the recording and reproduction of information can always be brought into accurate coincidence with the respective recording medium lines or spots, and the use of the electron beams leads to good accuracy. Further, the use of the secondary electron detection leads to the obtainment of a tracking signal of high S/N ratio.

Also, a number of electron beams are used to effect the recording/reproduction of information and therefore, the recording speed and the reproducing speed can be appreciably improved.

Also, a number of electron ray sources MEBD may be arranged, not only unilaterally, but also bilaterally.

Figure 14:
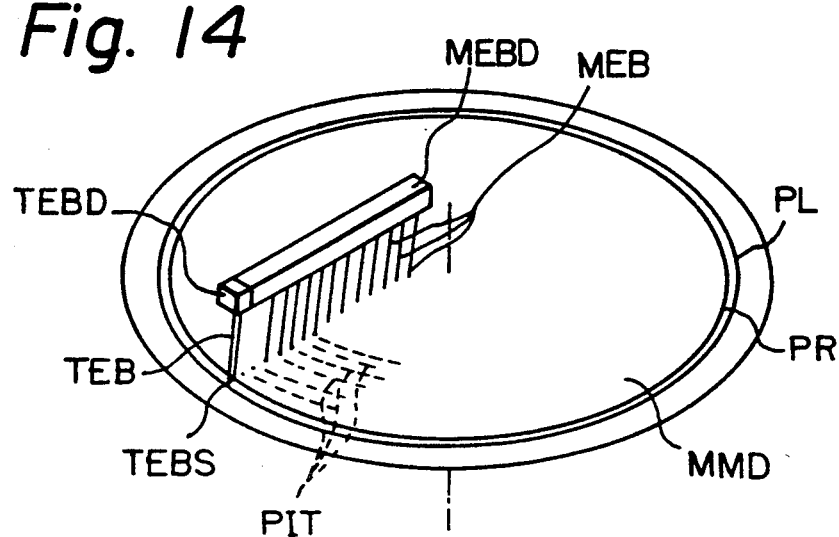
FIG. 14 is a schematic view showing an example of an information recording-reproducing apparatus with which the tracking error signal detecting apparatus of the present invention can be used.

In the embodiments shown in FIGS. 3, 5 and 7, the electron beams TEB and MEB can be easily deflected in the x direction as viewed in the respective figures. Therefore, description has been made of an example in which the recording medium MM is not moved, but as previously described, in the present invention, the traceability with respect to the vibration generated by the recording medium MM being moved is high and thus, the present invention is also effective, for example, for the form of a card in which the recording medium MM is moved in the x direction as viewed in the respective figures or for a case of the medium, such as a disk being rotated. For example, with the arrangement as shown in FIG. 14, even if the reference patterns PL and PR are vibrated by the eccentricity or the like of the recording medium MMD, the tracking electron beam TEB is always deflected by a deflecting electrode, not shown, so as to be positioned at the center of the reference patterns PL and PR. At this time, the plurality of electron beams MEB for the recording, reproduction and erasing of information are deflected under the influence of the same electric field and therefore, the positional relation between these electron beams MEB and the tracking electron beam TEB is always constant. This positional relation does not change in any of the recording, reproduction and erasing of information and therefore, the once recorded pit can be easily traced at high accuracy during reproduction.

Also, the present embodiment has been described with respect to an example in which the electron beams are deflected by electric fields, but of course, just the same effect can also be obtained by deflection using magnetic fields.

Thus, according to the present invention, a tracking error signal of high S/N ratio and very high accuracy is made detectable by the application of electron beams, and the electron beams are also used for the recording, reproduction and erasing of information, whereby recording of high density of 1 $\mu m\phi$ or less which is difficult to achieve by a light beam, becomes possible. Also, one or more electron beams used for the recording, reproduction and erasing of information can be easily deflected by a pair of deflecting, electrodes. Therefore, as compared to conventional light beam recording, which requires a number of optical systems and actuators corresponding to the number of beams, there can be arranged a high-speed and high-density memory which readily permits, high density mounting of electron beam generating sources.

Figure 15:
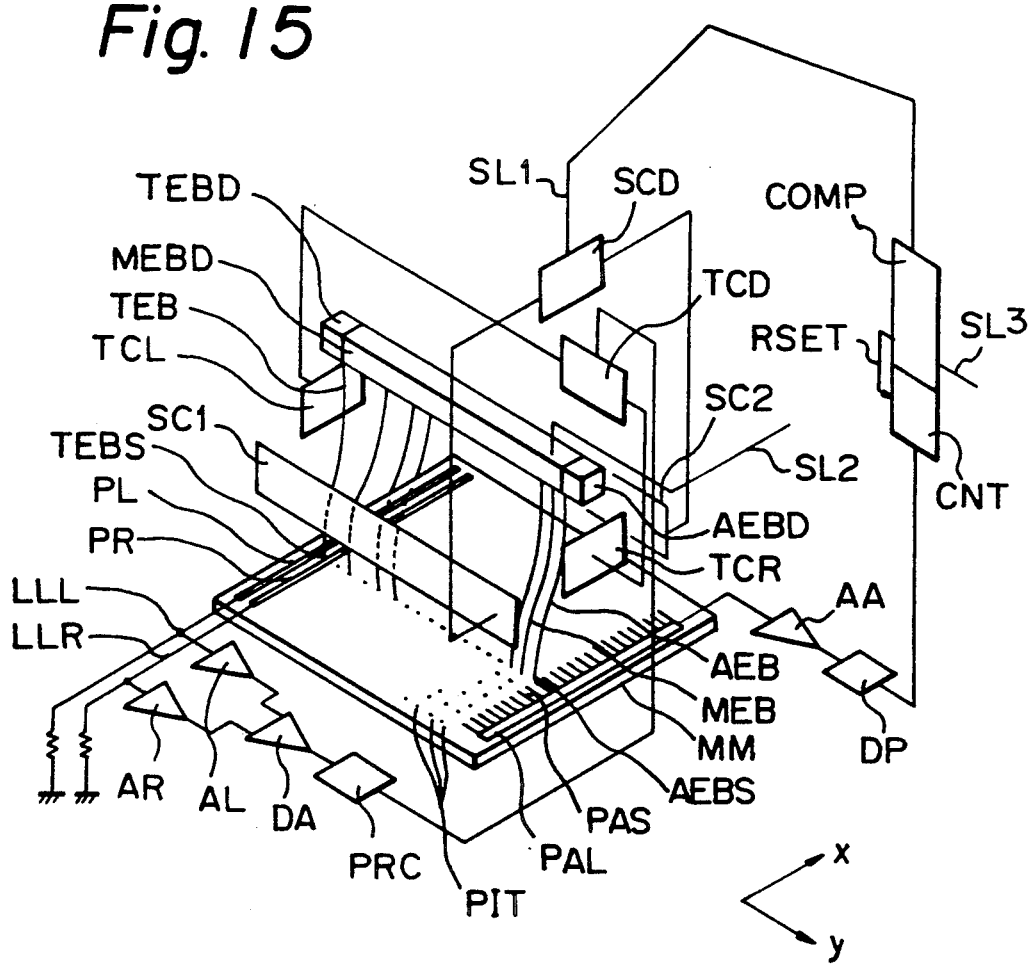
FIG. 15 is a schematic view showing an embodiment of the information recording-reproducing apparatus of the present invention.

FIG. 15 is a schematic view of an embodiment of the information recording-reproducing apparatus according to the present invention.

In FIG. 15, reference character MM designates a recording medium on which information is formed radially. Above the recording medium MM, there is disposed a generating source MEBD having independently modulatable electron beams MEB for effecting the recording, reproduction and erasing of information. A signal SL2 (in the case of recording, an information signal) for the recording and partial erasing of information is input to the electron beam generating source MEBD, which thus generates electron beams MEB modulated by the signal SL2. Again in the present embodiment, the generating source MEBD is an element comprising a plurality of electron beam sources arranged unilaterally with high density, and is similar to the form of the generating source MEBD used in each of the previously illustrated embodiments. The electron beam generating source MEBD can easily vary the current densities of individual electron beams MEB and therefore, during the recording or erasing of information, it can enhance the current densities in conformity with the information signal and cause a change in the quality of the material of the recording medium MM, to thereby form any pit PIT on the information tracks or extinguish any pit PIT formed on the information tracks. Also, during the reproduction of information, it can reduce the current densities and apply an electron beam to each pit PIT on the recording medium MM without causing a change in the quality of the material of the recording medium MM, thereby reproducing information. Also, during the recording of information, in conformity with the information signal, a plurality of electron beams can be applied to predetermined positions on the recording medium MM, for example, the plurality of information tracks on the recording medium MM, and by the electron beams being modulated, a number of bits of information can be recorded at the same time. The material of the recording medium MM may be Ge(11.5), Te(57.5), As(31) or the like which causes a phase variation of crystallizing the amorphous phase or making crystal amorphous by the application of electron beams MEB.

Also, a tracking electron beam generating source TEBD is provided on a side of the electron beam generating source MEBD, and this generating source TEBD generates a tracking electron beam TEB having a diameter of about 0.2 μm. The current density of the tracking electron beam TEB in this case is so low that a tracking spot TEBS formed on the recording medium MM does not cause a change in the quality of the material of the recording medium MM.

Further, an address data detecting electron beam generating source AEBD is provided on the side opposite to the tracking electron beam generating source TEBD with respect to the electron beam generating source MEBD, and this generating source AEBD generates an address data detecting electron beam AEB having a diameter of about 0.2 μm, similar to the tracking electron beam TEB. The current density of the address data detecting electron $ beam AEB in this case, like the tracking electron beam TEB, is low enough that the address data detecting electron beam spot AEBS formed on the recording medium MM does not cause a change in the quality of the material of the recording medium MM.

Further, on the recording medium MM, tracking reference patterns PL and PR comprising two parallel electrical conductors facing in the x direction are provided parallel to the information tracks, and current may flow through these patterns PL and PR upon the application of the electron beam TEB from the tracking electron beam generating source TEBD, the spacing between the two reference patterns PL and PR being about 0.1 μm. Lead wires LLL and LLR for leading out current are connected to the reference patterns PL and PR, respectively, and the output current thereof is converted into voltages, and connected to a differential amplifier DA via amplifiers AL and AR, respectively. The differential amplifier DA serves to amplify the difference between the outputs of the amplifiers AL and AR, and by the output thereof, the amount of current flowing through the reference patterns PL and PR can be compared with each other. The output from the differential amplifier DA is connected to a driver TCD via a phase compensating circuit PRC. The output of the driver TCD is applied to deflecting electrodes TCR and TCL which produce a uniform electric field for deflecting the tracking electron beam TEB, the address data detecting electron beam AEB and the plurality of electron beams MEB for the recording, reproduction and erasing of information at the same time in the y direction. This driver LCD is adapted to apply a voltage to the deflecting electrodes TCR and TCL in conformity with the output of the differential amplifier DA so that the deflecting electrodes TCR and TCL become positive and negative, respectively, when the current flowing through the reference pattern PL is greater than the current flowing through the reference pattern PR. Conversely, the driver TCD controls the voltages of the deflecting electrodes TCL and TCR in conformity with the output of the differential amplifier DA so that the deflecting electrodes TCR and TCL become negative and positive, respectively, when the current flowing through the reference pattern PL is smaller than the current flowing through the reference pattern PR.

Figure 16:
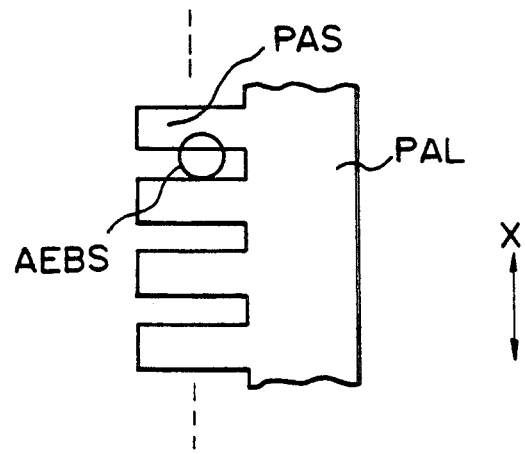
FIG. 16 illustrates an address detecting method for detecting the position of an electron beam on the recording medium in the apparatus of FIG. 15.

Also, on the recording medium MM, a number of rectangular minute conductor patterns PAS facing in the y direction are disposed in a direction perpendicular to the direction of arrangement of the electron beams MEB, i.e., in the x direction (the lengthwise direction of the tracks), and one side of the rectangle thereof is connected to a common electrode PAL, the output thereof being connected to an amplifier AA. The pitch between the conductor patterns PAS is 0.3 μm and the width of each conductor pattern PAS is 0.2 μm and therefore, the gap between the conductor patterns PAS is 0.1 μm. The details of these are shown in FIG. 16. In FIG. 16, when the address data detecting electron beam spot AEBS is on the conductor patterns PAS,.a great amount of current flows through the common electrode PAL, and when the electron beam spot AEBS is in the gap between the conductor patterns PAS, only a slight amount of current flows through the common electrode PAL. Therefore, the electron beam spot AEBS is deflected and scanned in the x direction, the output of the amplifier AA of FIG. 15 based on the output of the common electrode PAL becomes a signal having a periodical output fluctuation. In FIG. 15, the output fluctuation signal from the amplifier AA is input to a pulse generating circuit DP, which thus generates a pulse for one fluctuation of the signal from the amplifier AA, and this pulse is counted as the amount of beam movement ΔNCNT by a counter CNT. SL3 is a new address value supplied from a control circuit, not shown, and in a comparator COMP, this new address value SL3 is compared with the difference ΔNT from the current address value already preserved in the comparator COMP, and with the amount of beam movement ΔNCNT counted by the counter CNT. The output of the comparator COMP is sent a driver SCD, which thus outputs a voltage signal SL1, i.e., a signal SL1 for instructing deflecting electrodes SC1 and SC2 which deflect all electron beams in the x direction at the same time and produce a uniform electric field to produce such an electric field that the difference between the difference ΔNT of the address value and the amount of beam movement ΔNCNT is 0. Almost all of the components shown in FIG. 15 are contained in a vacuum container, not shown.

In such, an arrangement, when the tracking beam spot TEBS and the reference patterns PL, PR are in the relation as shown in FIG. 4A, the comparison of the current flowing through the reference patterns PL and PR shows that a greater current flows through the reference pattern PL to which,. a greater, amount of the electron beam TEB is applied. Therefore, a voltage is applied so that the deflecting electrodes TCR and TCL become positive and negative, respectively, as previously described, and the tracking electron beam TEB is deflected toward the deflecting electrode TCR side and the beam spot TEBS moves from the reference pattern PL side to the reference pattern PR side. At this time, the plurality of electron beams MEB for the recording, reproduction and erasing of information and the address data detecting electron beam AEB are also deflected under the influence of the same electric field as the electric field to which the tracking electron beam TEB is subjected.

On the other hand, when the tracking beam spot TEBS and the reference patterns PL, PR are in the relation as shown in FIG. 4B, the comparison of the currents flowing through the reference patterns PL and PR shows that a greater current flows through the reference pattern PR to which a greater amount of the electron beam TEB is applied and therefore, voltage is applied so that the deflecting electrodes TCR and TCL become negative and positive, respectively, as previously described, and the tracking electron beam TEB is deflected toward the deflecting electrode TCL side and the beam spot TEBS moves from the reference pattern PR side to the reference pattern PL side. Again at this time, as in the case of FIG. 4A, the plurality of electron beams MEB used for the recording, reproduction and erasing of information and the address data detecting electron beam AEB are deflected under the influence of the same electric field as that to which the tracking electron beam TEB is subjected.

Also, in the state shown in FIG. 4C, no signal is output from the differential amplifier DA and therefore, no voltage is applied to the deflecting electrodes TCR and TCL, and neither the tracking electron beam TEB, nor the plurality of electron beams MEB and the address data detecting electron beam AEB are deflected at all.

Actually, the above-described states of FIGS. 4A–4C are appropriately controlled, and the beam spot TEBS is controlled so as to be positioned in the state of FIG. 4C, i.e., the position intermediate of the reference patterns PL and PR.

In the present embodiment, it is possible to scan the tracking electron beam TEB along the reference patterns PL and PR with a high accuracy of 1/10 of the diameter of the beam spot TEBS, i.e., a diameter of the order of 0.2 $\mu$m. Thus, the plurality of electron beams MEB subjected to the same electric field as that to which the tracking electron beam TEB is subjected and the address data detecting electron beam AEB also effect scanning with the same accuracy on the tracking electron beam TEB, and the pit PIT recorded with the reference patterns PL and PR as the reference can be traced very accurately by scanning the reference patterns PL and PR by the tracking electron beam TEB during reproduction or erasing as well.

On the other hand, when a new command, i.e., an access command to a new address, is brought from a main control device, not shown, to the comparator COMP by the address value SL3, the comparator COMP outputs a reset signal RSET for clearing the counter CNT, that is, resetting the counter CNT to 0, and further finds the difference $\Delta$NT between the preserved current address value and the new address value SL3. Subsequently, the comparator COMP finds the difference $\Delta$NT-$\Delta$NCNT between the difference $\Delta$NT of the address value and the value of the counter CNT, i.e., the frequency $\Delta$NCNT with which the address data detecting electron beam AEB has crossed the minute conductor patterns PAS, and outputs an analog signal SL1. The signal SL1 is a positive voltage when $\Delta$NT-$\Delta$NCNT is positive, and is a negative voltage when $\Delta$NT-$\Delta$NCNT is negative, and the magnitude thereof is proportional to the absolute value $|\Delta$NT-$\Delta$NCNT$|$. The driver SCD is designed such that a voltage $\Delta$V proportional to the magnitude of the absolute value $|\Delta$NT-$\Delta$NCNT$|$ in such a direction that the deflecting electrode SC2 is rendered positive for a positive input and the deflecting electrode SC1 is rendered positive for a negative input is added to the current output voltage VC of the driver SCD.

Accordingly, if for example, the current address value is 5000 and the new address value is 3000, the difference $\Delta$NT between these address values is $\Delta$NT=5000-3000=2000. Also, at first, the counter CNT is reset by the signal RSET and the amount of beam movement is $\Delta$NCNT=0 and therefore, $\Delta$NT-$\Delta$NCNT=2000>0 and the signal SL1 becomes a positive signal, and in such a direction that the deflecting electrode SC2 becomes positive, a voltage $\Delta$V2000 whose magnitude is proportional to the absolute value $|\Delta$NT-$\Delta$NCNT$|$=2000 is added to the current output voltage VC of the driver SCD and thus, is varied by an amount corresponding to the deflecting voltage $\Delta$V2000 applied between the deflecting electrodes SC1 and SC2, and along therewith, the address data detecting electron beam AEB, the tracking electron beam TEB and the electron beams MEB for the recording, reproduction and erasing of information are all deflected in the x direction. At this time, the frequency with which the address data detecting electron beam spot AEBS has crossed the conductor patterns PAS is counted by the counter CNT. For example, assuming that the address data detecting electron beam spot AEBS has reached the address 2010 by deflection, the counting of the frequency $\Delta$NCNT=5000-3010=1990 with which the conductor patterns PAS has been crossed is effected in the counter CNT and thus, $\Delta$NT-$\Delta$NCNT=2000-1990=10, and a voltage $\Delta$V10 much less than the aforementioned voltage $\Delta$V2000 is further added to the voltage VC applied between the deflecting electrodes SC1 and SC2, and all electron beams TEB, AEB and MEB further approach a designated address. Actually, the above-described operation is continuously performed and thus, all electron beams TEB, AEB and MEB effect the access to the designated address in the same moment.

In the present embodiment, not only is the tracking beam the electron beam TEB, but also the beams MEB for effecting the recording, reproduction and erasing of information and the address data detecting beam AEB are electron beams. Therefore, deflection of the beams can be easily accomplished by means for deflecting the tracking electron beam TEB. Further, a plurality of electron beams can be arranged with high density they do not individually require deflecting means. Thus, light density of the beams can be easily accomplished, and a plurality of electron beams can be used while being modulated at the same time, in conformity with the information signal. Therefore, high-speed and highly dense recording becomes possible. Also, in the present embodiment, the tracking electron beam generating source TEBD, the plurality of electron beam generating sources MEBD and the address data detecting electron beam generating source AEBD have been described as discrete elements for the convenience of description, but in an element which generates a plurality of electron beams, it is also possible to adopt a form in which one or several electron beams are used for tracking, further one or several electron beams are used for address data detection and the remaining electron beams are used for the recording, reproduction and erasing of information.

Also, the present embodiment has beam described with respect to an example in which electron beams are deflected by electric fields, but of course, the same effect can be obtained by the deflection using magnetic fields.

As described above, the information recording-reproducing apparatus according to the present invention is constructed such that the electron beams for the recording, reproduction and erasing of information are deflected and scanned while the position on the recording medium is confirmed by means of an electron beam and therefore, high-speed access to the designated address becomes possible.

Figure 17:
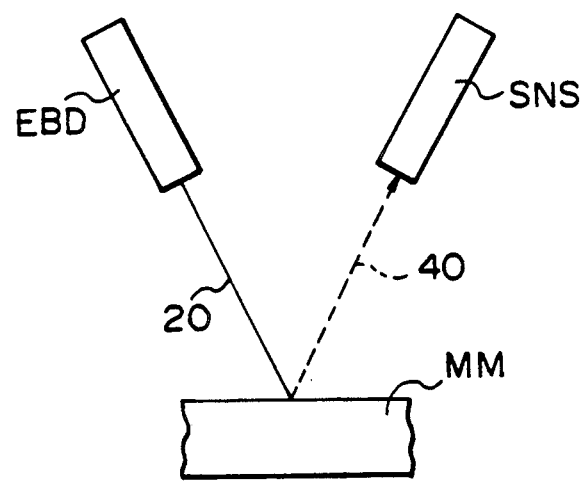
FIGS. 17 to 19 show modifications of the information recording-reproducing apparatus of the present invention.
Figure 18:
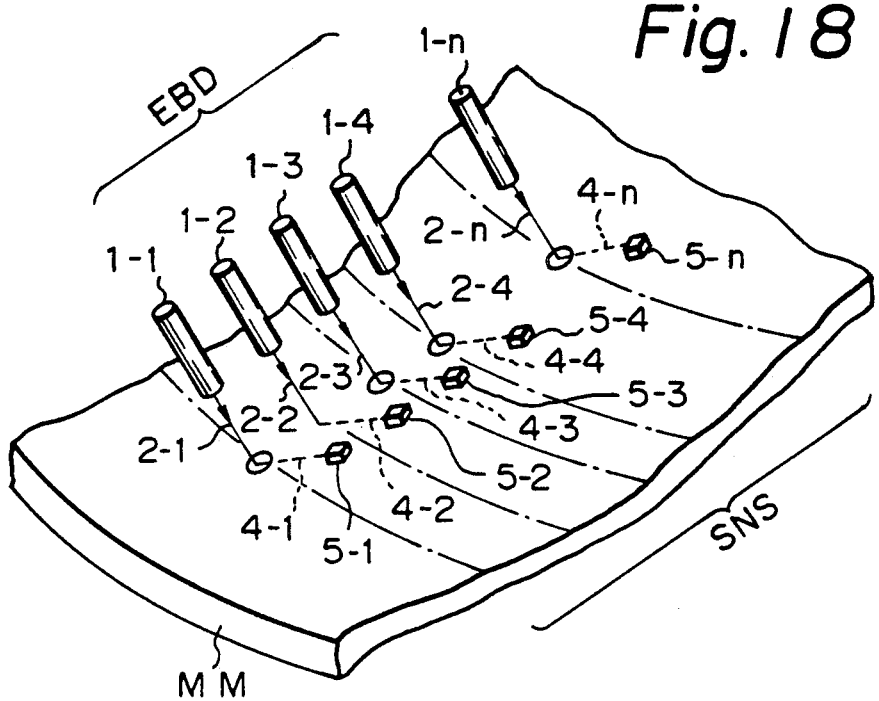
Figure 19:
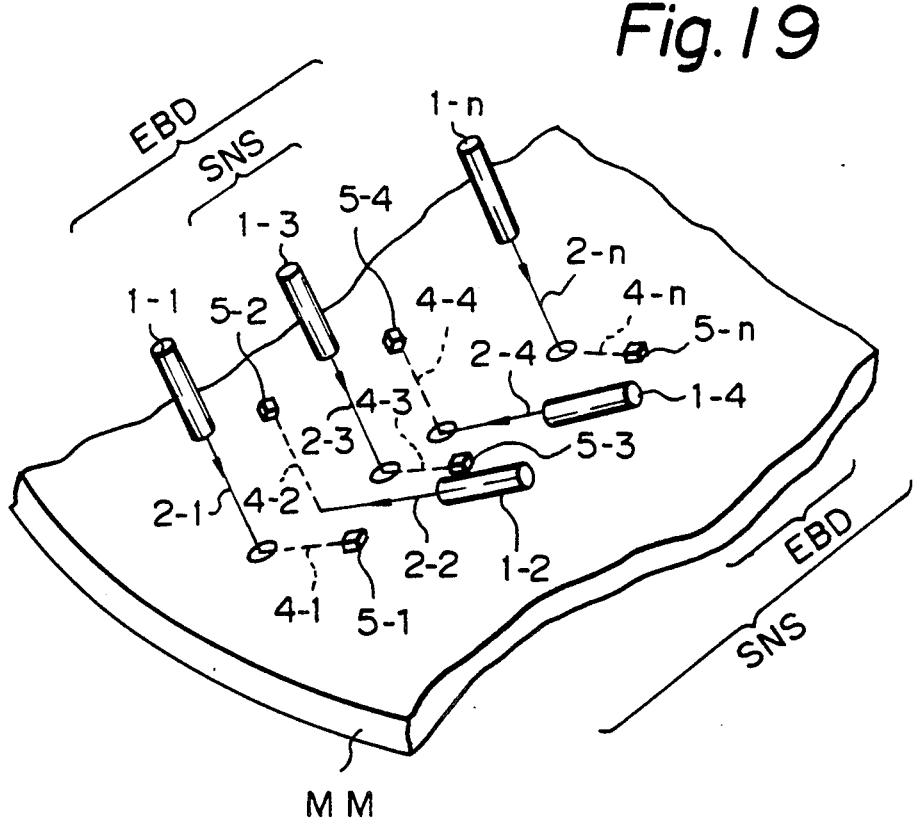

FIGS. 17 to 19 show modification of the information recording-reproducing apparatus according to the present invention, and the method carried out in the recording-reproducing apparatus described hereinafter is also applicable to the apparatuses shown in the hitherto described embodiments.

In these figures, EBD designates an electron ray generating source which generates an electron ray, reference numeral 20 denotes an electron ray emitted from the electron ray generating source EBD, MM designates a recording material in which the amount of emitted secondary electrons differs, depending on the internal state of the position when an electron ray is applied to the recording material, reference numeral 40 denotes secondary electrons emitted from the recording material MM upon the application of the electron ray 20, and SNS designates an electron ray detector for detecting the secondary electrons 40.

The principle of the information reproducing method of the present embodiment is simple, that is, when the electron ray 20 emitted from the electron ray generating source EBD enters a predetermined location on the recording material, secondary electrons are emitted from the recording material and a variation in the amount of emitted secondary electrons is detected by the electron ray detector SNS, whereby information is detected. That is, information is pre-recorded by the arrangement of two kinds of materials which differ in the amount of emitted secondary electrons for the application of the same amount of electrons.

Various materials are conceivable as the materials which differ in the amount of emitted secondary electrons (see *Scanning Electronic Microscope*, edited by the Kanto Branch of Japan Electronic Microscope Society and published by Kyoritsu Publishing Co., Ltd.), and for example, metals and oxides thereof can be used, and specifically, magnesium and oxides thereof and aluminum and oxides thereof may be mentioned.

When the above mentioned materials are used in the present invention, if the recording material MM is made of a metal and information is pre-recorded thereon by oxidizing the necessary portion thereof correspondingly to the information, a read-only-memory can be constructed.

Also, it is conceivable to use, as the recording material, a material whose crystalline state and non-crystalline state can be reversibly varied, for example, an amorphous semiconductor, and detect the emission of secondary electrons in the crystalline and non-crystalline states. In this case, it is by the cooling after heating that brings about a variation in crystalloid and therefore, if the method of heating and cooling by the energy of the electron ray is contrived and the cooling time for the recording portion is adjusted, recording can also be accomplished by the use of the electron ray.

The detector SNS may be a scintillator or the like used in a scanning type electronic microscope. However, the direction of emission of secondary electrons is not fixed and the electron ray 20 is emitted while being diffused from the point of incidence thereof and therefore, it is necessary to endow the detector SNS with sufficient directionality and to bring it as close as possible to the recording material MM.

FIG. 18 shows a construction developed from the construction of FIG. 17, and more particularly shows a construction in which a plurality of electron ray generating sources EBD (1-1, 1-2, 1-3, ... , 1-n) are disposed and correspondingly thereto, a plurality of secondary electron detectors SNS (5-1, 5-2, 5-3, ... , 5-n) are disposed.

In the case of such an arrangement, the data reading and writing speeds are made higher corresponding to the use of the plurality of electron ray generating sources and the plurality of secondary electron detectors. It should be noted here that it is necessary that a pair of electron ray generating sources and secondary electron detectors and a pair adjacent to both sides thereof be spaced apart from each other to such a degree that at least the read-out secondary electrons do not enter the adjacent secondary electron detector. This will be a great problem when high-speed and high density recording is the purpose.

FIG. 19 shows an embodiment improved over the embodiment of FIG. 18, and more particularly, shows an embodiment in which electron ray generating sources EBD and secondary electron detectors SNS are alternately disposed to thereby solve the above-noted problem.

The present invention is not restricted to the above described embodiments, but various modifications and applications thereof are possible.

For example, the present invention permits the use of, not only an electron ray but also any beam if emitted electrons are obtained when a beam such as an ion beam or an X-ray beam is applied to the recording medium.

According to the above-described information recording-reproducing method and apparatus, a high density of information can be accomplished simply. Also, a high density and high speed of recording and reproduction can be accomplished by arranging a plurality of predetermined beam generating sources and an electron ray detector skillfully.

Figure 20:
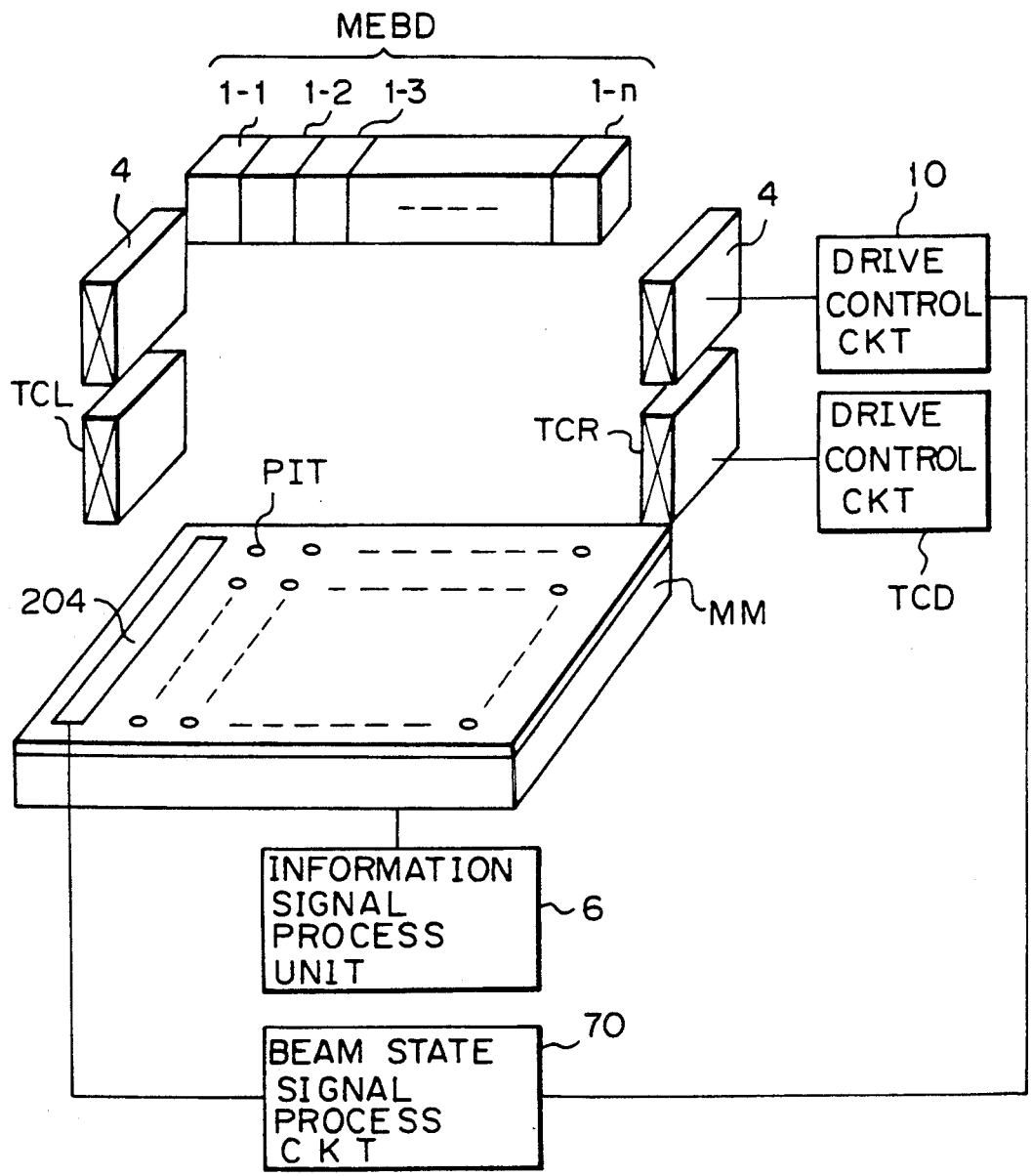
FIG. 20 is a schematic view showing a further modification of the information recording-reproducing apparatus of the present invention.

FIG. 20 is a schematic view showing a further modification of the information recording-reproducing apparatus according to the present invention. The application state detecting method shown herein and described later is applicable to the information recording-reproducing apparatuses shown in the hitherto illustrated embodiments.

The electron beam application state detecting method will also hereinafter be described in detail with respect to a specific embodiment thereof.

FIG. 20 shows an embodiment of the recording apparatus using multiple electron beams and having electron beam application state detecting means.

In FIG. 20, reference characters MEBD designate solid electron beam generator (MEB) heads, reference numeral 4 denotes electromagnetic lenses for focusing electron beam emitted from the heads MEBD, reference numeral 10 designates a drive control circuit therefore, TCL and TCR denote electromagnetic lenses for deflecting the focused electron beams, TCD designates a drive control circuit therefore, MM denotes a recording medium, and PIT designates record pits recorded on the recording medium MM by the electron beams. Reference numeral 204 denotes an electron beam state detecting pattern which, in the apparatus of FIG. 20, is used for auto-focus signal detection and is usually formed in the recording medium manufacturing process. Reference numeral 70 designates a beam state signal processing circuit for processing the signal from the pattern 204, and reference numeral 6 denotes an information signal processing unit for processing the information signal from the recording medium MM.

In such an arrangement, a plurality of electron beams emitted from the MEB heads MEBD are focused by the electromagnetic magnetic lenses 4 and deflected toward a desired recording position. One of these beams is applied to the pattern 204. The auto-focus signal detecting pattern 204 is, for example, a pattern electrode formed of an electrically conductive material as shown in FIG. 21.

Figure 21:
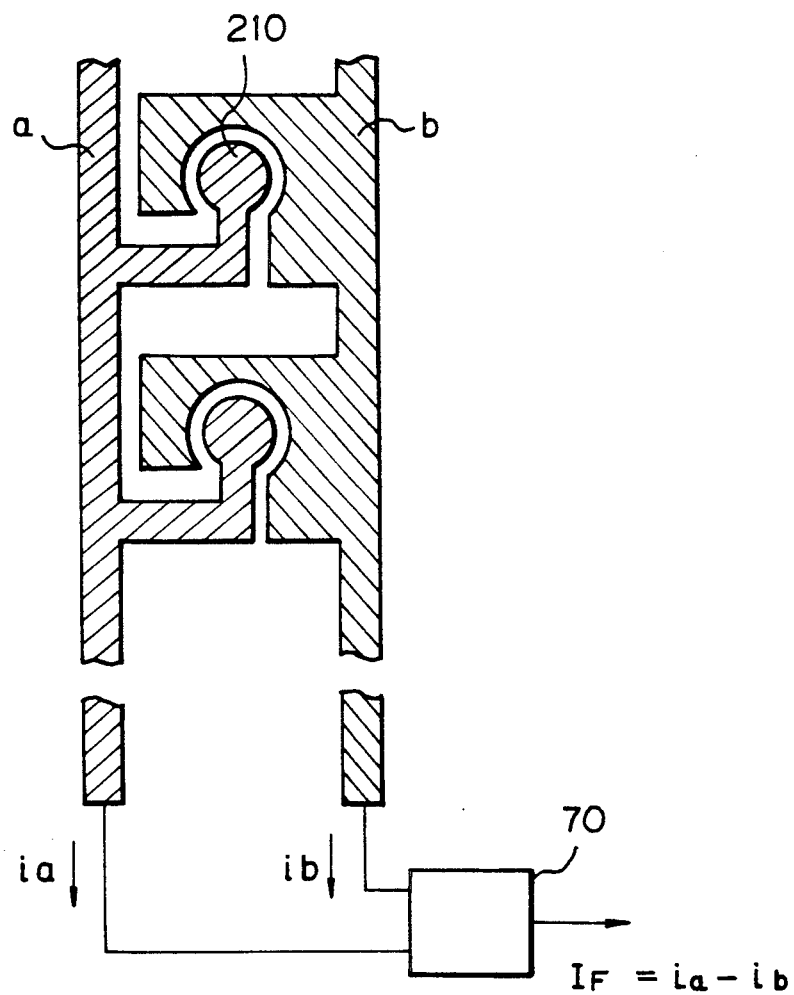
FIG. 21 illustrates a method of detecting the applied state of the electron beam in the apparatus shown in FIG. 20.

In FIG. 21, electrodes a and b are insulated from each other, and when electron beams are applied thereto, electron currents ia and ib flow through the beam state signal processing circuit 70. Here, consider the difference between the current values of ia and ib, If=ia - ib. The portion 210 of the electrode a is a circular pattern having a radius equal to the desired beam diameter, and the spacing between the electrodes a and b is set to less than the beam diameter. If the time when a beam is applied to the portion 210 with the same size as the portion 210 is the time of in-focus, If=ia because ib=0. However, when the beam deviates from the in focus position and becomes larger, it is also applied to the electrode b and thus, ib≠0 and If=ia−ib<ia. Consequently, the maximum value of If is ia, and since If deviates from its maximum value during the other times than the time of in-focus, a feedback loop is applied to the two electromagnetic lenses 4 shown in FIG. 20 to control the same lenses, so that If is always the maximum value (ib=0), whereby the focused diameters of not only one beam for focusing, but also all the remaining electron beams on the recording medium are always kept constant.

A plurality of focusing patterns 204 may be provided on the MEB heads MEBD to increase the accuracy.

Figure 22A:
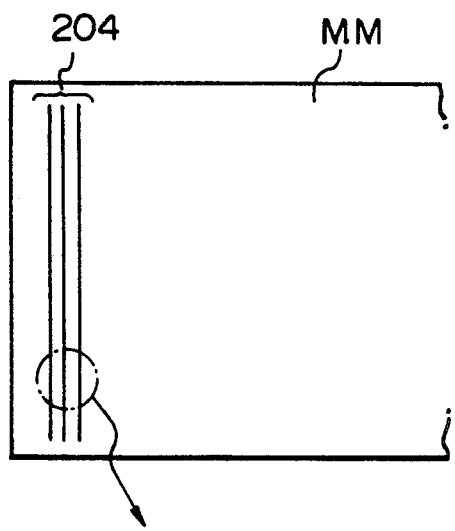
FIGS. 22A, 22B and 23 illustrate another example of the method of detecting the applied state of the electron beam.
Figure 22B:
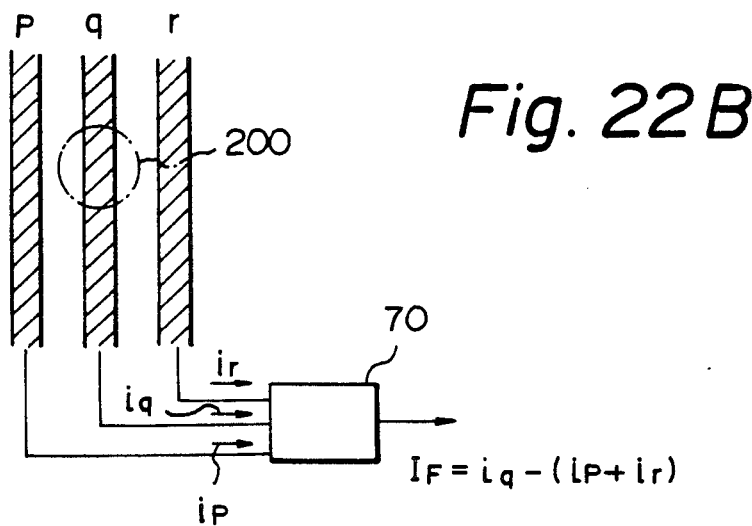

FIGS. 22A and 22B show another embodiment of the electron beam state detecting pattern electrode 204 in the present invention, FIG. 22A being a plan view of the recording medium MM, and FIG. 22B being an enlarged view of the pattern 204.

The present embodiment can be used in the same recording apparatus as the first embodiment, except for the recording medium formed by three conductor patterns p, q and r insulated from one another as shown. Also, as in the first embodiment, electron currents ip, iq and it can be taken out from the electrodes on which beams have impinged into the beam state signal processing circuit 70. In this case, if the line widths and spacing of the three conductor patterns p, q and r are set to the same degree as the desired beam diameter, the desired electron beam diameter can be detected. Considering If=iq−ip−ir, if the time when a beam spot 200 impinges on the electrode q as shown in FIG. 22B is the in-focus position, ip=0 and ir=0, and If=iq. When the beam diameter deviates from the in-focus position and becomes large, ip≠0 or iq≠0 and therefore, If becomes smaller than during the in-focus. Consequently, a feedback loop is always applied to the two electromagnetic lenses 4 shown in FIG. 20 to control the same lenses so that If is maximized, whereby the focused diameters of the other electron beams on the recording medium can be made constant.

The present invention is not restricted to the above-described embodiment, but various modifications and applications thereof are possible.

For example, the shape of the beam state detecting pattern is not limited to the shapes shown in FIGS. 21, 22A and 22B, but may be any of various shapes including a measure-like shape. The measure-like shape refers to a case wherein linear patterns as shown in FIG. 22B are formed vertically and horizontally by being superposed one upon another. Of course, the vertical and horizontal patterns need be insulated from one another, and such patterns are formed by first forming vertical (horizontal) patterns, thereafter forming an insulating layer at locations whereat the horizontal (vertical) patterns (overlap one another, and forming horizontal (vertical) patterns thereon. In this case, the number of terminals for detecting the current flowing upon application of the electron beam is increased, but there is an advantage that the two-dimensional position can be accurately detected. As viewed from the view point of image, the measure-like shape is similar to the measures of section paper.

Figure 23:
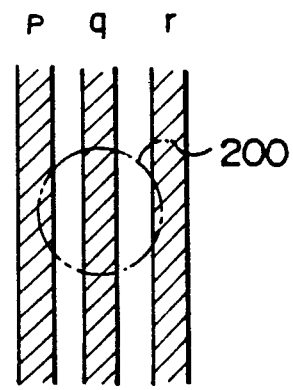

Further, in the case of tracking, the spacing between the linear patterns of FIGS. 22A and 22B is made narrower (see FIG. 23) and a spot may be applied not only to q, but also to p and r to detect the amounts of current of ip and ir, whereby accuracy can be improved.

If the electron beam application state detecting method as described above is used, the state of the electron beams on the recording medium can be simply detected and moreover, this control method directly uses electron beams and therefore, focusing and tracking of very good accuracy and high S/N ratio can be accomplished.

Further, the method of the present embodiment also has the advantage that in the recording method using multiple electron beams, one electron beam is used for signal detection to control the focusing lenses or the like and the other recording-reproducing beams can all be kept in the same state at the same time.

What is claimed is:

1. An information recording apparatus for recording information by irradiating at least first and second tracks extending in a predetermined parallel direction on an information recording medium with an electron beam, said recording apparatus comprising:
   irradiating means comprising a first radiation source for generating a first electron beam to radiate the first track and a second radiation source for generating a second electron beam to radiate the second track, said first and second radiation sources of said irradiating means being provided on a common substrate;
   recording means for recording information by forming a bit pattern on each track in the predetermined direction by the electron beam; and
   deflecting means for electromagnetically deflecting the first and second electron beams in the predetermined direction and in a direction substantially perpendicular to the predetermined direction, such that the bit pattern on the first track is formed by said first electron beam and the bit pattern on the second track is formed by said second electron beam.

2. A recording apparatus according to claim 1, wherein said deflecting means comprises means for generating an electric field.

3. An apparatus according to claim 1, wherein said deflecting means comprises means for generating a magnetic field.

4. An information reproducing apparatus for reproducing information by irradiating at least first and second tracks extending in a predetermined parallel direction on an information recording medium with an electron beam, the information being reproduced by directing the electron beam to each track for reading a bit pattern formed in the predetermined direction, said reproducing apparatus comprising:
   irradiating means comprising a first radiation source for generating a first electron beam to radiate the first track and a second radiation source for generating a second electron beam to radiate the second track, said first and second radiation sources of said irradiating means being provided on a common substrate;

reading means for reading the bit pattern of each track in response to being irradiated by said irradiating means; and deflecting means for electromagnetically deflecting the first and second electron beams in the predetermined direction and in a direction substantially perpendicular to the predetermined direction.

5. A reproducing apparatus according to claim 4, wherein said deflecting means comprises means for generating an electric field.

6. A reproducing apparatus according to claim 4, wherein said deflecting means comprises means for generating a magnetic field.

7. An information recording apparatus for recording information by irradiating at least first and second tracks extending in a predetermined parallel direction on an information recording medium with an electron beam, the recording medium having a tracking pattern for tracking arranged in the predetermined direction, said recording apparatus comprising:

irradiating means comprising a first radiation source for generating a first electron beam to radiate the first track, a second radiation source for generating a second electron beam to radiate the second track and a third radiation source for generating a third electron beam to radiate the tracking pattern, said first, second, and third radiation sources of said irradiating means being provided on a common substrate;

recording means for recording information by directing the electron beams to each of the tracks for forming a bit pattern in the predetermined direction; and deflecting means for electromagnetically deflecting the first, second and third electron beams in a direction substantially perpendicular to the predetermined direction such that, y aligning said third electron beam with the tracking pattern, the bit pattern on the first track is formed by said first electron beam and the bit pattern on the second track is formed by said second electron beam.

8. An apparatus according to claim 7, wherein said deflecting means comprises means for generating an electric field.

9. An apparatus according to claim 8, further comprising second deflecting means comprising means for electromagnetically deflecting the first, second and third electron beams in the predetermined direction.

10. An apparatus according to claim 7, wherein said deflecting means comprises means for generating a magnetic field.

11. An apparatus according to claim 10, further comprising second deflecting means comprising means for electromagnetically deflecting the first, second and third electron beams in the predetermined direction.

12. An information reproducing apparatus for reproducing information by irradiating at least first and second tracks extending in a predetermined direction on an information recording medium with an electron beam, the medium having a tracking pattern for tracking formed in the predetermined direction and the information being reproduced by directing the electron beam to each of the tracks for reading a bit pattern formed in the predetermined direction, said reproducing apparatus comprising:

irradiating means comprising a first radiation source for generating a first electron beam to radiate the first track, a second radiation source for generating a second electron beam to radiate the second track and a third radiation source for generating a third electron beam to radiate the tracking pattern, said first, second, and third radiation sources of said irradiating means being provided on a common substrate;

reading means for reading the bit pattern of each track in response to being irradiated by said irradiating means; and deflecting means for electromagnetically deflecting the first, second and third electron beams in a direction substantially perpendicular to the predetermined direction.

13. A reproducing apparatus according to claim 12, wherein said deflecting means comprises means for generating an electric field.

14. A reproducing apparatus according to claim 13, further comprising second deflecting means comprising means for electromagnetically deflecting the first, second and third electron beams in the predetermined direction.

15. A reproducing apparatus according to claim 15, wherein said deflecting means comprises means for generating a magnetic field.

16. A reproducing apparatus according to claim 15, further comprising second deflecting means comprising means for electromagnetically deflecting the first, second and third electron beams in the predetermined direction.

17. A method of recording information on a medium provided with first and second tracks extending in a predetermined direction and adapted to react to an electron beam by forming a bit pattern on the first and second tracks along the predetermined direction, said method comprising the steps of:

providing a common substrate on which a first electron beam source for emitting a first electron beam and a second electron beam source for emitting a second electron beam are formed; and directing the first electron beam and the second electron beam from the substrate to the first track and the second track, respectively, and thereby forming a bit pattern on each of the first and second tracks.

18. A method according to claim 17, wherein said forming step comprises deflecting the first and second electron beam along the predetermined direction.

19. A method according to claim 17, wherein said forming step comprises the steps of:

directing a third electron beam from a third electron beam source formed on the common substrate to a third track on the medium for tracking; and deflecting the first, second and third electron beams substantially in a direction perpendicular to the predetermined direction so as to align the third electron beam with the third track, and thereby aligning the first and second electron beam with the first and second tracks, respectively.

20. A method according to claim 17, wherein said forming step comprises the steps of:

directing a third electron beam from a third electron beam source formed on the common substrate to a third track on the medium for focusing; and controlling beam diameters of the first, second and third electron beams on the medium simultaneously so as to focus the third beam on the third track, and thereby focusing the first and second electron beams on the first and second tracks, respectively.

21. A method of reproducing information recorded on a medium provided with first and second tracks extending in a predetermined direction and adapted to react to an electron beam by detecting a bit pattern formed on the first and second tracks along the predetermined direction, said method comprising the steps of:
providing a common substrate on which a first electron beam source for emitting a first electron beam and a second electron beam source for emitting a second electron beam are formed; and
directing the first electron beam and the second electron beam from the substrate to the first track and the second track, respectively, and thereby detecting a bit pattern on each of the first and second tracks.

22. A method according to claim 21, wherein said detecting step comprises deflecting the first and second electron beams along the predetermined direction.

23. A method according to claim 21, wherein said detecting step comprises the steps of:
directing a third electron beam from a third electron beam source formed on the common substrate to a third track on the medium for tracking; and
deflecting the first, second and third electron beams simultaneously in a direction perpendicular to the predetermined direction so as to align the third electron beam with the third track, and thereby aligning the first and second electron beams with the first and second tracks, respectively.

24. A method according to claim 21, wherein said detecting step comprises the steps of:
directing a third electron beam from a third electron beam source formed on the common substrate to a third track on the medium for focusing; and
controlling beam diameters of the first, second and third electron beams on the medium simultaneously so as to focus the third electron beam on the third track, and thereby focusing the first and second electron beams on the first and second tracks, respectively.

25. An apparatus for recording information on a medium provided with first and second tracks extending in a predetermined direction and adapted to react to an electron beam by forming a bit pattern on the first and second tracks along the predetermined direction, said apparatus comprising:
electron beam applying means including a common substrate on which a first electron beam source for emitting a first electron beam and a second electron beam source for emitting a second electron beam are formed, said electron beam applying means directing the first electron beam and the second electron beam from the common substrate to the first track and the second track, respectively; and
control means for controlling said electron beam applying means in accordance with information to be recorded so as to form a bit pattern on the first track with the first electron beam and to form a bit pattern on the second track with the second electron beam.

26. An apparatus for reproducing information recorded on a medium provided with first and second tracks extending in a predetermined direction and adapted to react to an electron beam by detecting a bit pattern formed on the first and second tracks along the predetermined direction, said apparatus comprising:
electron beam applying means including a common substrate on which a first electron beam source for emitting a first electron beam and a second electron beam source for emitting a second electron beam are formed, said electron beam applying means directing the first electron beam and the second electron beam from the common substrate to the first track nd the second track, respectively; and
detecting means for detecting a bit pattern on each of the first and second tracks electron beam to the first track and a signal generated upon application of the second electron beam to the second track.

27. A method of recording information on a medium provided with a first track extending in a predetermined direction and adapted to react to an electron beam by forming a bit pattern on the first track along the predetermined direction further provided with a second track for a tracking operation parallel to the first track, said method comprising the steps of:
providing a common substrate on which a first electron beam source for emitting a first electron beam and a second electron beam source for emitting a second electron beam are formed;
deflecting the first and second electron beams simultaneously in a direction perpendicular to the predetermined direction so as to align the second beam with the second track, and thereby aligning the first electron beam with the first track; and
forming a bit pattern on the first track with the aligned first electron beam.

28. A method of reproducing information recorded on a medium provided with a first track extending in a predetermined direction and adapted to react to an electron beam by detecting a bit pattern formed on the first track along the predetermined direction and further provided with a second track for a tracking operation parallel to the first track, said method comprising the steps of:
providing a common substrate on which a first electron beam source for emitting a first electron beam and a second electron beam source for emitting a second electron beam are formed;
deflecting the first and second electron beams simultaneously in a direction perpendicular to the predetermined direction so as to align the second electron beam with the second track, and thereby aligning the first electron beam with the first track; and
detecting a bit pattern on the firs track with the aligned first electron beam.

29. A method of recording information on a medium provided with a first track extending in a predetermined direction and adapted to react to an electron beam by forming a bit pattern on the first track along the predetermined direction further provided with a second track for a focusing operation parallel to the first track, said method comprising the steps of:
providing a common substrate on which a first electron beam source for emitting a first electron beam and a second electron beam source for emitting a second electron beam are formed;
controlling the beam diameters of the first and second electron beams on the medium simultaneously so as to focus the second electron beam on the second track and thereby focusing the first electron beam on the first track; and forming a bit pattern on the first track with the focused first electron beam.

30. A method of reproducing information recorded on a medium provided with a first track extending in a predetermined direction and adapted to react to an electron beam by detecting a bit pattern formed on the first track along the predetermined direction nd further provided with a second track for a focusing operation parallel to the first track, said method comprising the steps of:

providing a common substrate on which a first electron beam source for emitting a first electron beam and a second electron beam source for emitting a second electron beam are formed;

controlling the beam diameters of the first and second beams on the medium simultaneously so as to focus the second electron beam on the second track, and thereby focusing the first electron beam on the first track; and detecting a bit pattern on the first track by the focused first electron beam.

31. An apparatus for recording information on a medium provided with a first track extending in a predetermined direction and adapted to react to an electron beam by forming a bit pattern on the first track along the predetermined direction and further provided with a second track for a tracking operation parallel to the first track, said apparatus comprising:

beam applying means comprising a common substrate on which a first electron beam source for emitting a first electron beam and a second electron beam source for emitting a second electron beam are formed and further comprising a deflector for deflecting the first and second electron beams, said beam applying means directing the first and second electron beams to the medium;

signal generating means for generating a signal indicative of a deviation of the second electron beam from the second track; and control means for controlling said deflector in response to the generated signal to simultaneously deflect the first and second electron beams in a direction perpendicular to the predetermined direction so as to align the first electron beam with the first track.

32. An apparatus for reproducing information recorded on a medium provided with a first track extending in a predetermined direction and adapted to react to an electron beam by detecting a bit pattern formed on the first track along the predetermined direction and further provided with a second track for a tracking operation parallel to the first track, said apparatus comprising:

beam applying means comprising a common substrate on which a first electron beam source for emitting a first electron beam and a second electron beam source for emitting a second electron beam are formed and further comprising a deflector for deflecting the first and second electron beams, said beam applying means directing the first and second electron beams to the medium;

signal generating means for generating a signal indicative of a deviation of said second electron beam from the second track; and control means for controlling said deflector in response to the generated signal to simultaneously deflect the first and second electron beams in a direction perpendicular to the predetermined direction so as to align the first electron beam with the first track.

33. An apparatus for recording information on a medium provided with a first track extending in a predetermined direction and adapted to react to an electron beam by forming a bit pattern on the first track along the predetermined direction and further provided with a second track for a focusing operation parallel to the first track, said apparatus comprising:

beam applying means comprising a common substrate on which a first electron beam source for emitting a first electron beam and a second electron beam source for emitting a second electron beam are formed and further comprising an electron lens for converging the first and second electron beams, said beam applying means directing the first and second electron beams to the medium;

signal generating means for generating a signal indicative of the beam diameter of the second electron beam on the medium; and control means for controlling said electron lens in response to the generated signal to simultaneously modulate the beam diameters of the first and second electron beams on the medium so as to focus the first electron beam on the first track.

34. An apparatus for reproducing information recorded on a medium provided with a first track extending in a predetermined direction and adapted to react to an electron beam by detecting a bit pattern formed on the first track along the predetermined direction and further provided with a second track for a focusing operation parallel to the first track, said apparatus comprising:

beam applying means comprising a common substrate on which a first electron beam source for emitting a first electron beam and a second electron beam source for emitting a second electron beam are formed and further comprising an electron lens for converging the first and second electron beams, said beam applying means directing the first and second electron beams to the medium;

signal generating means for generating a signal indicative of the beam diameter of the second electron beam on the second track; and control means for controlling said electron lens in response to the generated signal to simultaneously modulate the beam diameters of the first and second electron beams on the medium so as to focus the first electron beam on the first track.

35. A method of recording information on a medium provided with first and second portions and adapted to react to electron energy by forming a bit patter on the first and second portions, said method comprising the steps of:

providing a common substrate on which a first electron energy transmitter for transmitting first electron energy and a second electron energy transmitter for transmitting second electron energy are formed; and forming a bit pattern on each of the first and second portions, respectively, by directing the first energy and the second electron energy from the first and second transmitters, respectively.

36. A method of reproducing information recorded on a medium provided with first and second portions and adapted to react to electron energy by detecting a bit pattern formed on the first and second portions, said method comprising the steps of:

providing a common substrate on which a first electron energy transmitter for transmitting first electron energy and a second electron energy transmitter for transmitting second electron energy are formed; and detecting a bit pattern on each of the first and second portions, respectively, by directing the first electron energy and the second electron energy from the first and second transmitters, respectively.

37. An apparatus for recording information on a medium provided with first and second portions and adapted to react to electron energy by forming a bit pattern on the first and second portions, said apparatus comprising;

electron energy transmitting means comprising a common substrate on which a first electron energy transmitter for transmitting first electron energy and a second electron energy transmitter for transmitting second electron energy are formed; and control means for controlling said electron energy transmitting means in accordance with information to be recorded to form a bit pattern on the first portion with the firs electron energy and to form a bit pattern on the second portion with the second electron energy.

38. An apparatus for reproducing information recorded on a medium provided with first and second portions and adapted to react to electron energy by detecting a bit pattern formed on the first and second portions, said apparatus comprising:

electron energy transmitting means comprising a common substrate on which a first electron energy transmitter for transmitting first electron energy and a second electron energy transmitter for transmitting second electron energy are formed; and detecting means for detecting a bit pattern on each of the first and second portions, respectively, by directing the first electron energy and the second electron energy from the first and second electron energy transmitters, respectively.

* * * * *

UNITED STATES PATENT AND TRADEMARK OFFICE
CERTIFICATE OF CORRECTION

PATENT NO. : 5,270,990
DATED : December 14, 1993
INVENTOR(S) : NOBUTOSHI MIZASAWA, ET AL.

It is certified that error appears in the above-indentified patent and that said Letters Patent is hereby corrected as shown below:

ON THE COVER PAGE, ITEM [56] REFERENCES CITED:

UNDER "U.S. PATENT DOCUMENTS":

"4,001,493 1/1977 Coal" should read --4,001,493 1/1977 Cone --; and

"4,061,495 1/1977 Cone .... 369/101X" should be deleted.

COLUMN 1:

Line 9, "application" (second occurrence) should read --application,--;
Line 41, "slitter" should read "splitter--;
Line 42, "disk," should read --disk--; and
Line 57, "spot LBS" should read --spot LBS,--.

COLUMN 2:

Line 47, "unsuitable" should read --unsuitable,--.

COLUMN 4:

Line 7, "designate" should read --designates--; and
Line 35, "like" should read --like,--.

UNITED STATES PATENT AND TRADEMARK OFFICE
CERTIFICATE OF CORRECTION

PATENT NO. : 5,270,990
DATED : December 14, 1993
INVENTOR(S) : NOBUTOSHI MIZASAWA, ET AL.

It is certified that error appears in the above-indentified patent and that said Letters Patent is hereby corrected as shown below:

COLUMN 5:

Line 3, "the" (first occurrence) should read --at the--; and
    Line 37, "greater," should read --greater--.

COLUMN 6:

Line 13, "detection." should read --direction.--;
    Line 16, "continuously" should read --continuously.--; and
    Line 17, "TEBS spot" should read --spot TEBS--.

COLUMN 7:

Line 18, "later-with" should read --later with--.

COLUMN 9:

Line 5, "which" should read --which,--;
    Line 12, "loops" should read --loop,--;
    Line 21, "than" should read --than this--;
    Line 41, "electron SE" should read --electrons SE--.

COLUMN 10:

Line 29, the right margin should be closed up; and
    Line 30, the left margin should be closed up.

UNITED STATES PATENT AND TRADEMARK OFFICE
CERTIFICATE OF CORRECTION

PATENT NO. : 5,270,990  Page 3 of 6
DATED : December 14, 1993
INVENTOR(S) : NOBUTOSHI MIZASAWA, ET AL.

It is certified that error appears in the above-indentified patent and that said Letters Patent is hereby corrected as shown below:

COLUMN 11:

Line 16, "code" should read --codes--; and
    Line 34, "the," should read --the--.

COLUMN 13:

Line 21, "vaccum" should read --vacuum--.

COLUMN 14:

Line 19, "driven SCD" should read --driver SCD--;
    Line 54, "therefore" should read --therefore,--; and
    Line 68, "course" should read --course,--.

COLUMN 15:

Line 31, "limited" should read --limited to--.

COLUMN 17:

Line 1, "triangle" should read --triangle.--.

COLUMN 18:

Line 15, "deflecting," should read --deflecting--; and
    Line 20, "permits," should read --permits--.

UNITED STATES PATENT AND TRADEMARK OFFICE
CERTIFICATE OF CORRECTION

PATENT NO. : 5,270,990
DATED : December 14, 1993
INVENTOR(S) : NOBUTOSHI MIZASAWA, ET AL.

It is certified that error appears in the above-indentified patent and that said Letters Patent is hereby corrected as shown below:

COLUMN 19:

Line 15, "$" should be deleted; and
    Line 47, "driver LCD" should read --driver TCD--.

COLUMN 20:

Line 7, "patterns PAS,." should read --patterns PAS,--;
    Line 12, "the" should read --when the--;
    Line 43, "which,. a greater," should read --which a greater--;
    Line 54, the right margin should be closed up; and
    Line 55, the left margin should be closed up.

COLUMN 21:

Line 18, "of" should be deleted.

COLUMN 22:

Line 34, "density" should read --density and--;
    Line 40, "highly dense" should read --high density--; and
    Line 53, "beam" should read --been--.

UNITED STATES PATENT AND TRADEMARK OFFICE
CERTIFICATE OF CORRECTION

PATENT NO. : 5,270,990
DATED : December 14, 1993
INVENTOR(S) : NOBUTOSHI MIZASAWA, ET AL.

It is certified that error appears in the above-indentified patent and that said Letters Patent is hereby corrected as shown below:

COLUMN 24:

Line 23, "ray" should read --ray,--; and
    Line 49, "beam" should read --beams--.

COLUMN 26:

Line 3, "(overlap" should read --overlap--.

COLUMN 27:

Line 42, "y" should read --by--;
    Line 64, "beam" should read --beam,--; and
    Line 65, ",the" should read --the--.

COLUMN 28:

Line 27, "claim 15," should read --claim 12,--;
    Line 52, "beam" should read --beams--;
    Line 59, "substantially" should read --simultaneously--; and
    Line 62, "beam" should read --beams--.

COLUMN 30:

Line 12, "nd" should read --and--;
    Line 14, "tracks electron" should read --tracks by use of a signal generated upon application of the first electron--; and
    Line 53, "firs" should read --first--.

UNITED STATES PATENT AND TRADEMARK OFFICE
CERTIFICATE OF CORRECTION

PATENT NO. : 5,270,990
DATED : December 14, 1993
INVENTOR(S) : NOBUTOSHI MIZASAWA, ET AL.

It is certified that error appears in the above-indentified patent and that said Letters Patent is hereby corrected as shown below:

COLUMN 31:

Line 9, "nd" should read --and--.

COLUMN 32:

Line 54, "patter" should read --pattern--; and
    Line 63, "first" should read --first electron--.

COLUMN 34:

Line 4, "firs" should read --first--.

Signed and Sealed this

Eleventh Day of October, 1994

Attest:

BRUCE LEHMAN

*Attesting Officer*     *Commissioner of Patents and Trademarks*

UNITED STATES PATENT AND TRADEMARK OFFICE
CERTIFICATE OF CORRECTION

PATENT NO. : 5,270,990
DATED : December 14, 1993
INVENTOR(S) : NOBUTOSHI MIZUSAWA ET AL.

It is certified that error appears in the above-indentified patent and that said Letters Patent is hereby corrected as shown below:

ON THE COVER PAGE

IN ITEM "[75] INVENTORS":

"Nobutoshi Mizasawa" should read
--Nobutoshi Mizusawa--.

Signed and Sealed this

Twenty-first Day of February, 1995

Attest:

BRUCE LEHMAN

*Attesting Officer*      *Commissioner of Patents and Trademarks*